Feb. 22, 1966    W. LOVELAND ETAL    3,236,022
AUTOMATIC CARTON CLOSING MACHINE
Filed Aug. 24, 1962    13 Sheets-Sheet 1

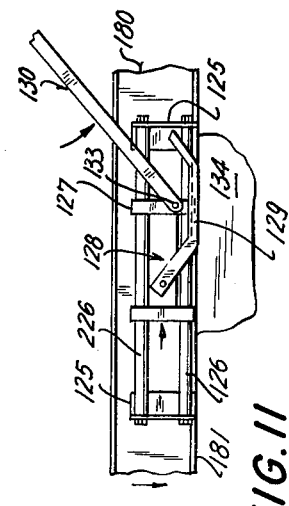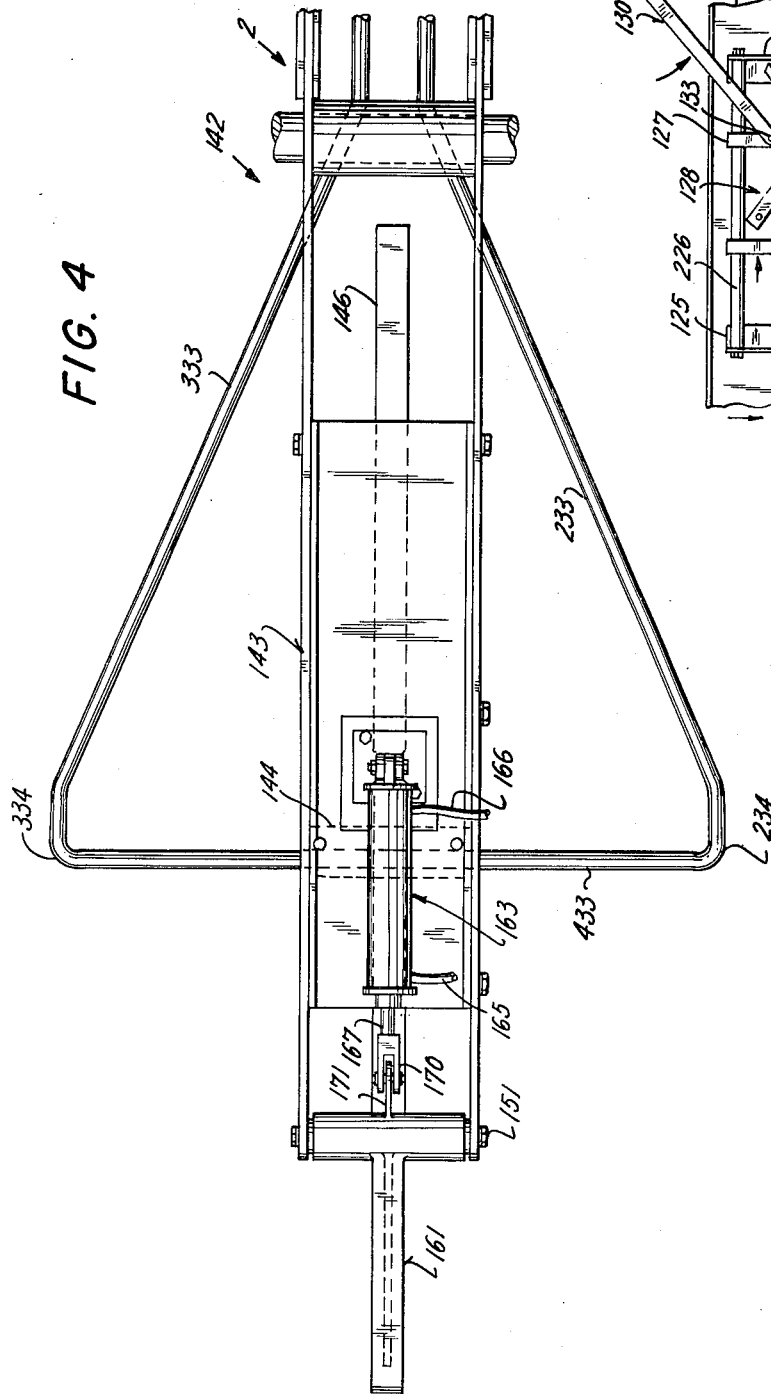

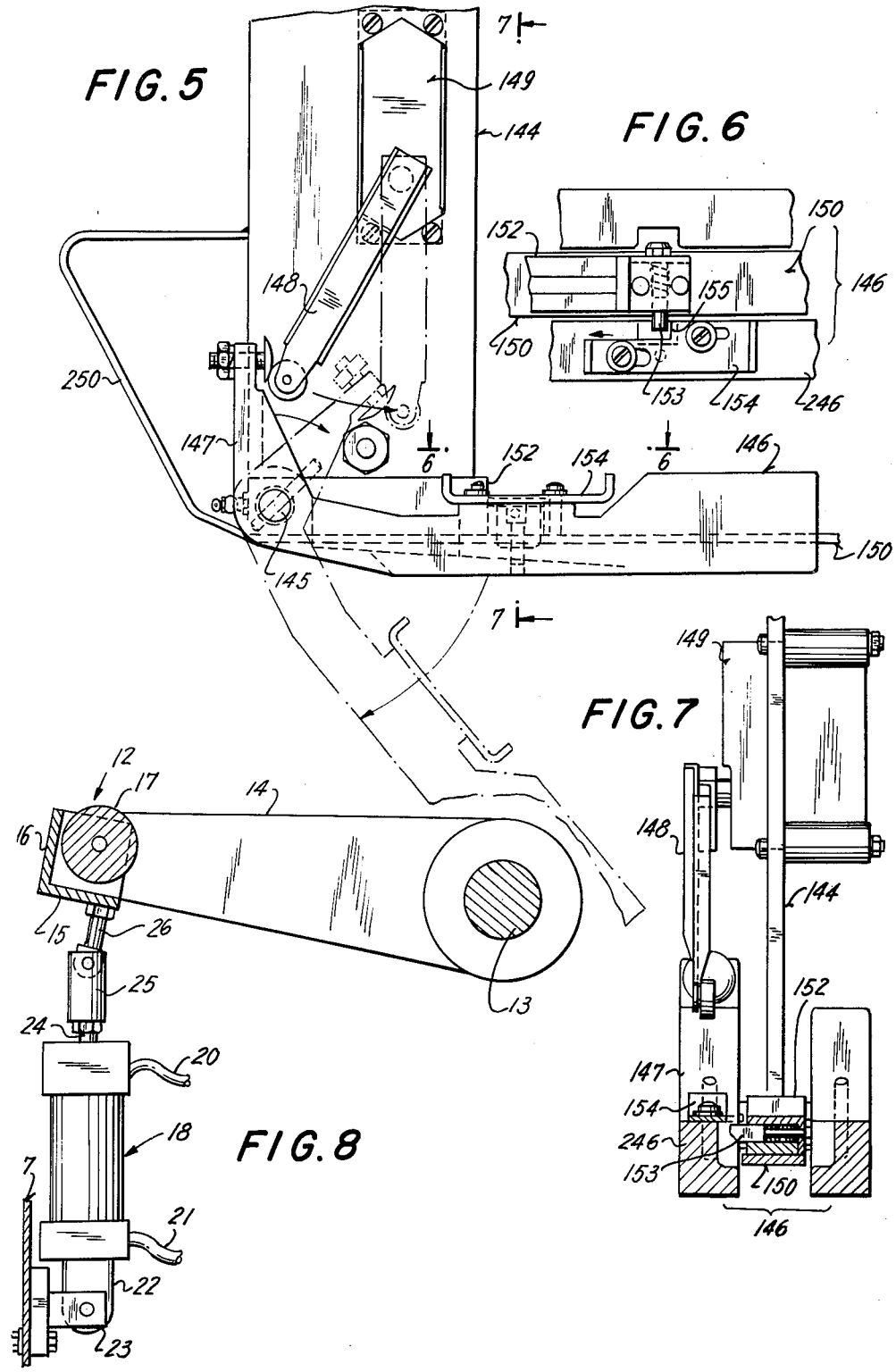

//

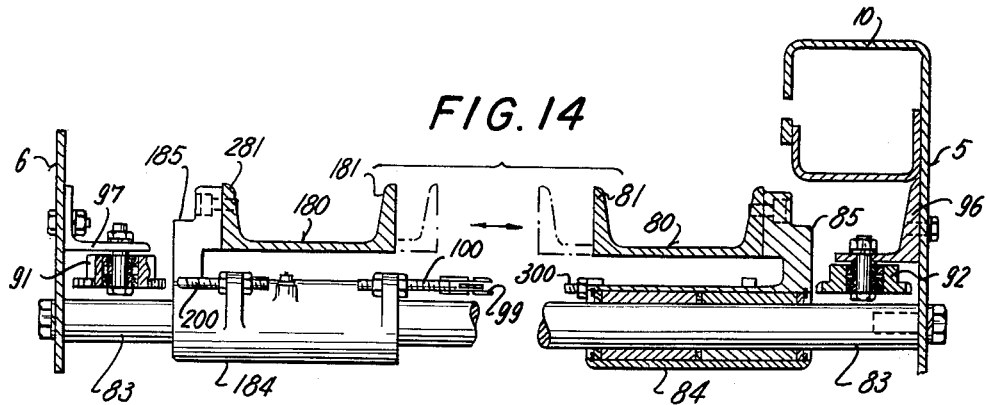
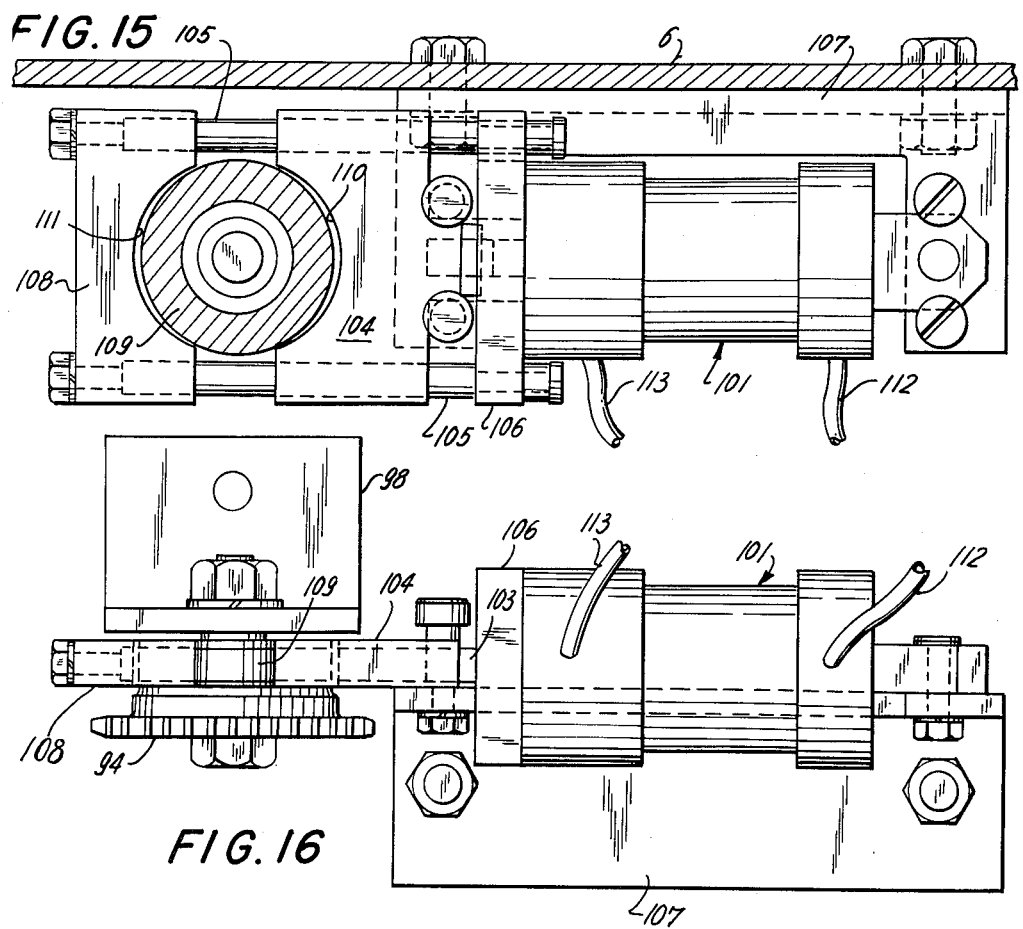

Feb. 22, 1966   W. LOVELAND ETAL   3,236,022
AUTOMATIC CARTON CLOSING MACHINE
Filed Aug. 24, 1962   13 Sheets-Sheet 8

Feb. 22, 1966  W. LOVELAND ETAL  3,236,022
AUTOMATIC CARTON CLOSING MACHINE
Filed Aug. 24, 1962  13 Sheets-Sheet 9

Feb. 22, 1966 W. LOVELAND ETAL 3,236,022
AUTOMATIC CARTON CLOSING MACHINE
Filed Aug. 24, 1962 13 Sheets-Sheet 10

Feb. 22, 1966   W. LOVELAND ETAL   3,236,022
AUTOMATIC CARTON CLOSING MACHINE
Filed Aug. 24, 1962   13 Sheets-Sheet 13
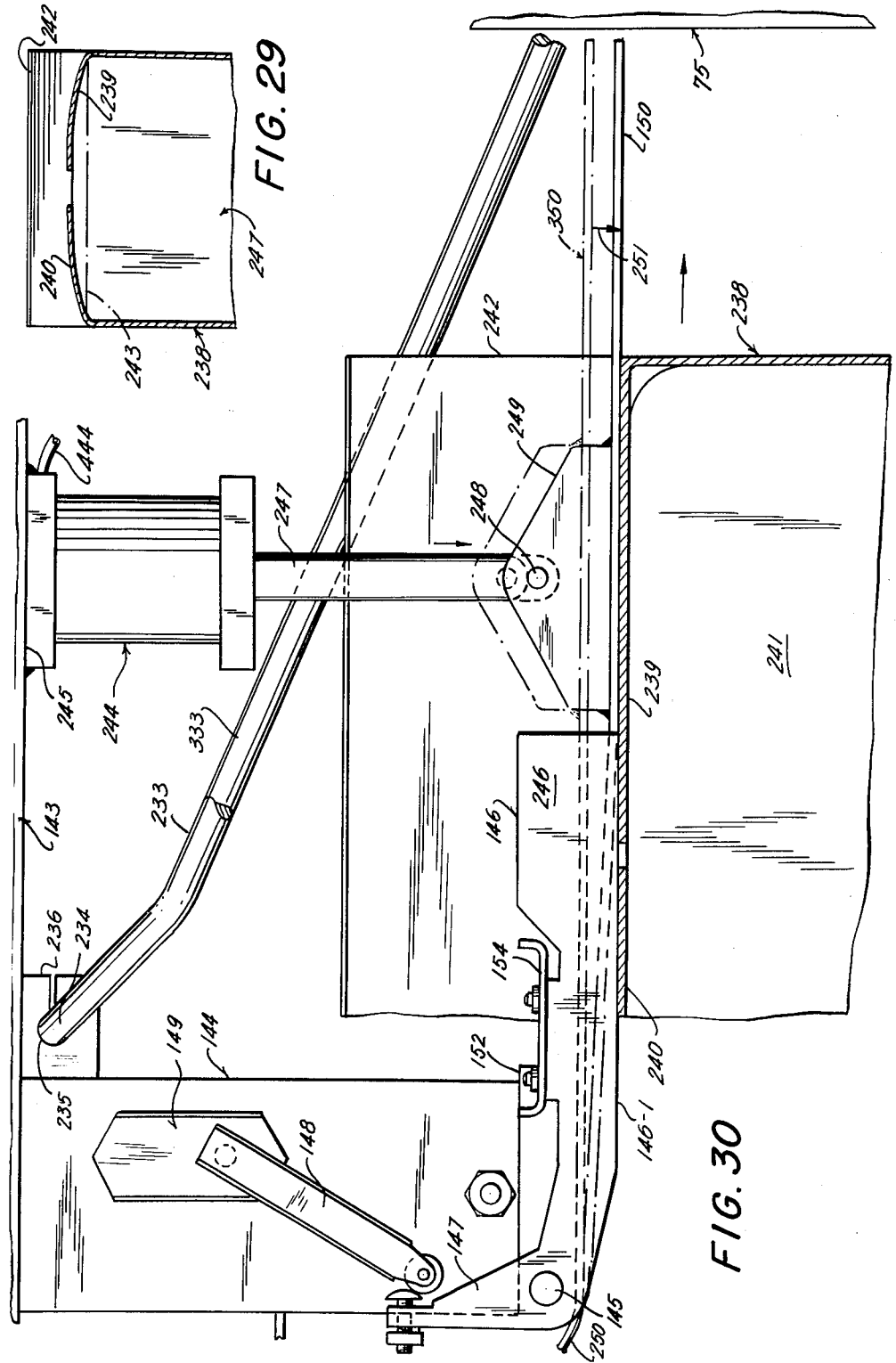

United States Patent Office 3,236,022
Patented Feb. 22, 1966

3,236,022
AUTOMATIC CARTON CLOSING MACHINE
Winton Loveland, Freeport, and Saul Warshaw, Forest Hills, N.Y., assignors to The Loveshaw Corporation, Farmingdale, Long Island, N.Y., a corporation of New York
Filed Aug. 24, 1962, Ser. No. 219,212
23 Claims. (Cl. 53—75)

The present invention relates to machines for folding to closed positions the extending flaps of the open tops of conventional cartons, e.g., after they have been filed with goods to be distributed or marketed therein, and may supplement or embody any suitable folded flap securing means, such as the adhesive tape applying mechanism of our copending application for United States Letters Patent Serial No. 139,676, filed September 21, 1961.

Prior to the present invention various types of machines have been proposed semi-automatically or automatically to close the tops of successively fed loaded rectangular paperboard cartons, such as those formed from corrugated board, each having four upstanding flaps respectively located at the front, back and side top edges. It is common practice to close each carton top by folding these flaps down to a substantially common lateral plane in overlapping relation and securing them together, such as by applying adhesive to opposed flap surfaces, or securing them together by staples or adhesive tape.

It is an object of the present invention to provide an unusually effective machine, which may be readily constructed and efficiently operated automatically to close successively the tops of a series of such cartons in a rapid and sure manner, and to adjust itself to the physical bulk and shape of each of a plurality of successive cartons as it is sensed thereby, although the cartons may be of random sizes.

Another object of the invention is to provide the machine with manual control means permitting it to be easily conditioned at will for continuous operation successively to close a plurality of cartons of uniform size sequentially fed thereto after it has automatically adjusted itself to one of the cartons of uniform size. Such operation on cartons of uniform size desirably is many times faster than the speed of closing successively a plurality of cartons of random sizes since, after adjustment to one of the cartons of uniform size, adjustment and sensing operations for accommodating carton dimensions are locked out effectively in accordance with the present invention. For cartons of uniform size it is no longer necessary to advance flap closing mechanism to the top of each carton and then retract it for successive advance to the next following carton, nor to do this with respect to carton clamping and guiding mechanism thereof. In other words, it becomes unnecessary for the machine to sense the size of each uniform carton at its flap folding station to dictate proper flap folding operations thereof.

A further object of the present invention is to provide carton responding control means dictating a certain flap folding operation with is automatically adjustable along the path of carton advance in the machine whereby the control means is positioned automatically farther forward in the vicinity of the flap folding means for narrower cartons than for wider cartons. The distance of this automatic advance is proportionate to the width of each carton. This is particularly advantageous since the width of a carton dictates the height of its upwardly-extending unfolded top flaps and the effectiveness of the folding of at least one of these flaps, such as the back flap on the trailing top edge of the carton, is improved for a plurality of successive cartons of different sizes being run through the machine if this particular flap of each carton is engaged by the folding mechanism in similar manner.

Other objects of this invention will in part be obvious and will in part appear hereinafter.

The invention accordingly comprises the features of construction, combination of elements, and arrangement of parts, which will be exemplified in the construction hereinafter set forth, and the scope of the invention will be indicated in the claims.

For a fuller understanding of the nature and objects of the invention reference should be had to the following detailed description taken in connection with the accompanying drawings, in which:

FIG. 1 is a side elevational view to reduced scale, with parts omitted for clarity, of an embodiment of the automatic carton closing machine of the present invention;

FIG. 3 is a view similar to FIG. 2, with parts in section, of the remaining discharge end of the bed of the machine;

FIG. 4 is an enlarged top plan view, with parts broken away, of a portion of the flap folding head of the machine depicted in FIGS. 1, 2 and 3;

FIG. 5 is a side elevational view to enlarged scale, with parts broken away, of flap folding mechanism shown in FIGS. 1 and 4, with members manipulated to alternative positions being indicated in dot-dash lines;

FIG. 6 is a detail view substantially on line 6—6 of FIG. 5, with parts broken away;

FIG. 7 is a back elevational view with parts in section taken substantially on line 7—7 of FIG. 5;

FIG. 8 is an enlarged section taken substantially on line 8—8 of FIG. 2, showing details of the entrance gate and its operating mechanism;

FIG. 11 is a top plan view, with parts broken away, of physical carton sensing control means, such as an electrical circuit switch, mounted for adjustable translation along the carton travel path shown in FIG. 2 to be located between the selector gate and head elevating mechanism at the sensing station, illustrating a portion of a carton thereat which effects operation of this switch;

FIG. 14 is an enlarged sectional view, with parts broken away, taken substantially on line 14—14 of FIG. 2;

FIG. 15 is an enlarged detail plan view of clamping means for rail translating mechanism shown in FIG. 2, with parts in section;

FIG. 16 is a side elevational view of the clamping means shown in FIG. 15;

Figure 2:
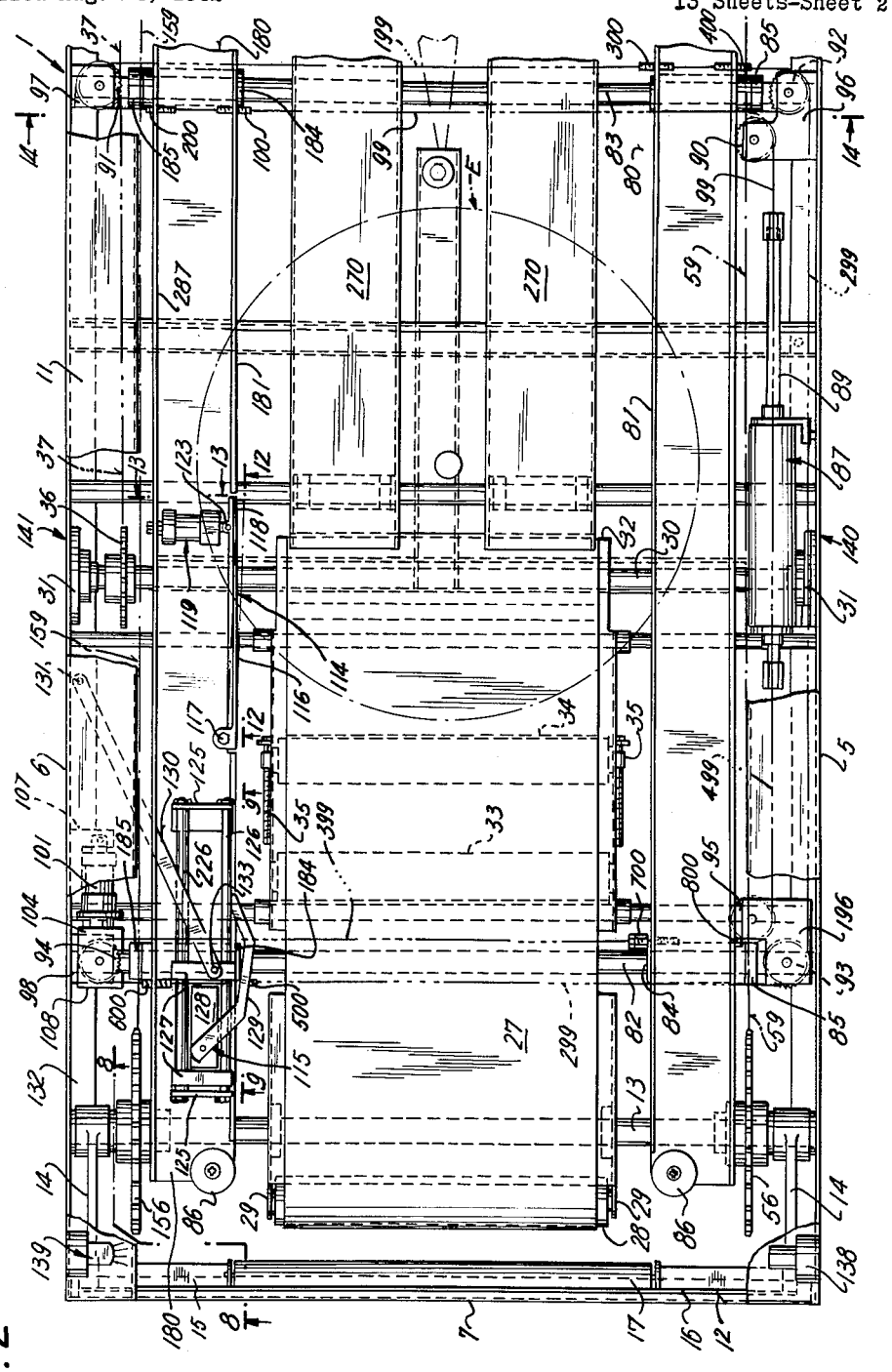
FIG. 2 is a top plan view to larger scale, with parts broken away, of the entrance end of the bed unit of the machine shown in FIG. 1.
Figure 9:
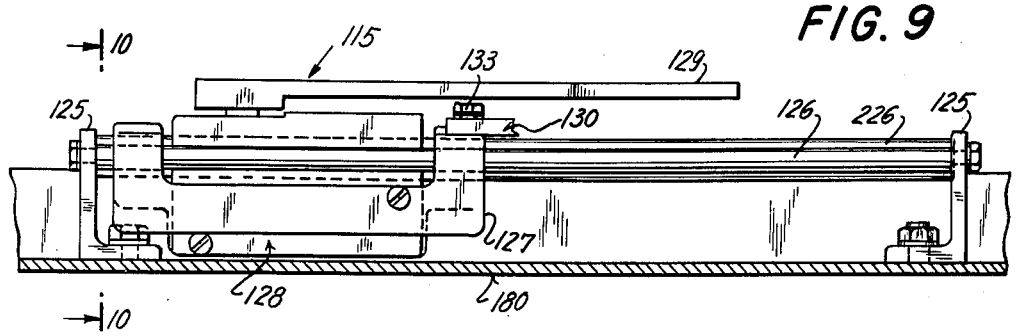
FIG. 9 is an enlarged sectional view taken substantially on line 9—9 of FIG. 2, showing parts in side elevation.
Figure 10:
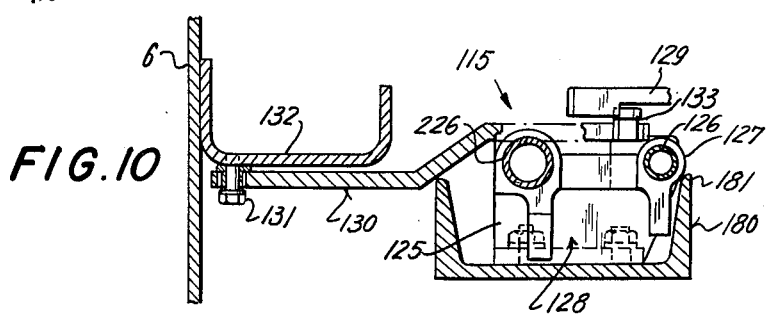
FIG. 10 is a sectional view, with parts broken away, taken substantially on line 10—10 of FIG. 9.
Figure 12:
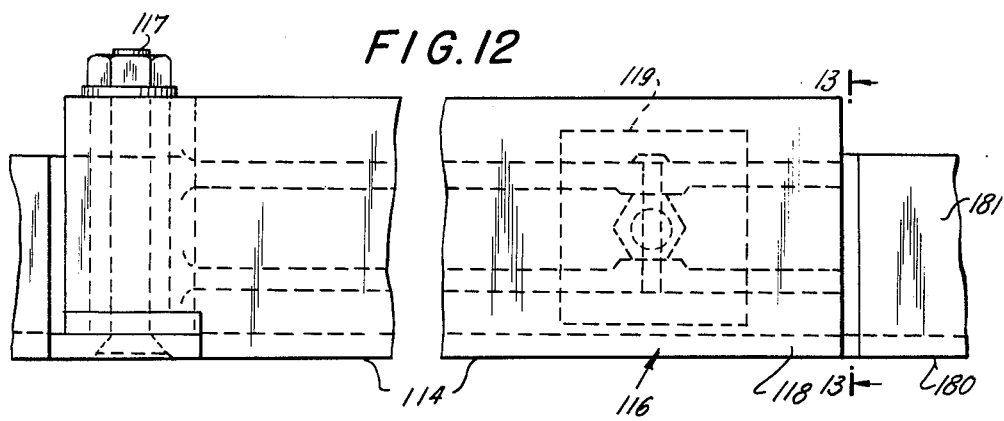
FIG. 12 is an enlarged side elevational view, with parts broken away, taken substantially on line 12—12 of FIG. 2.
Figure 13:
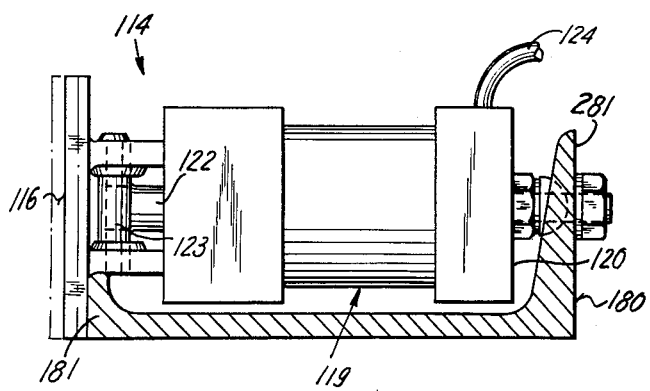
FIG. 13 is a sectional view taken substantially on line 13—13 of FIGS. 2 and 12, showing parts in elevation.
Figure 25:
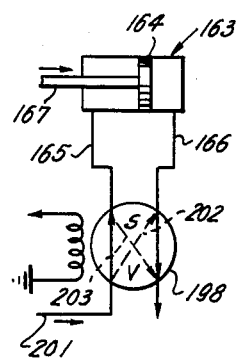
FIG. 25 is a diagrammatic view of pneumatic equipment for operating the back flap folder or kicker mounted on the head and shown in FIG. 1.
Figure 26:
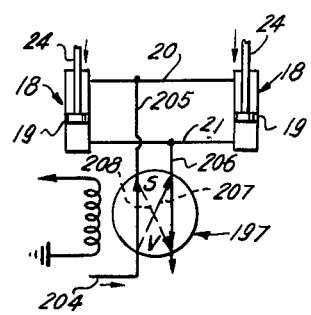
FIG. 26 is a diagrammatic view similar to FIG. 25 of pneumatic equipment for operating the entrance or selector gate shown in FIGS. 1, 2 and 8.
Figure 27:
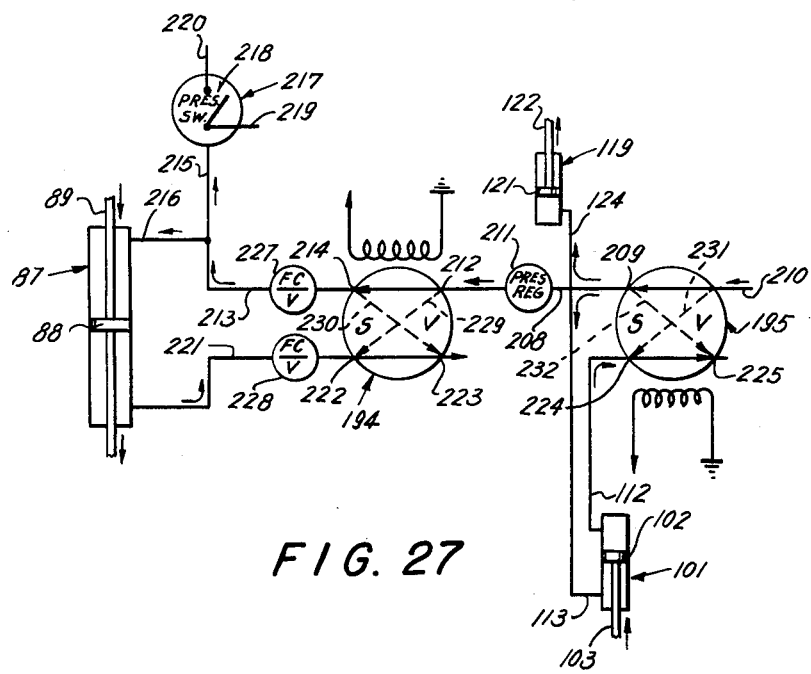
Figure 28:
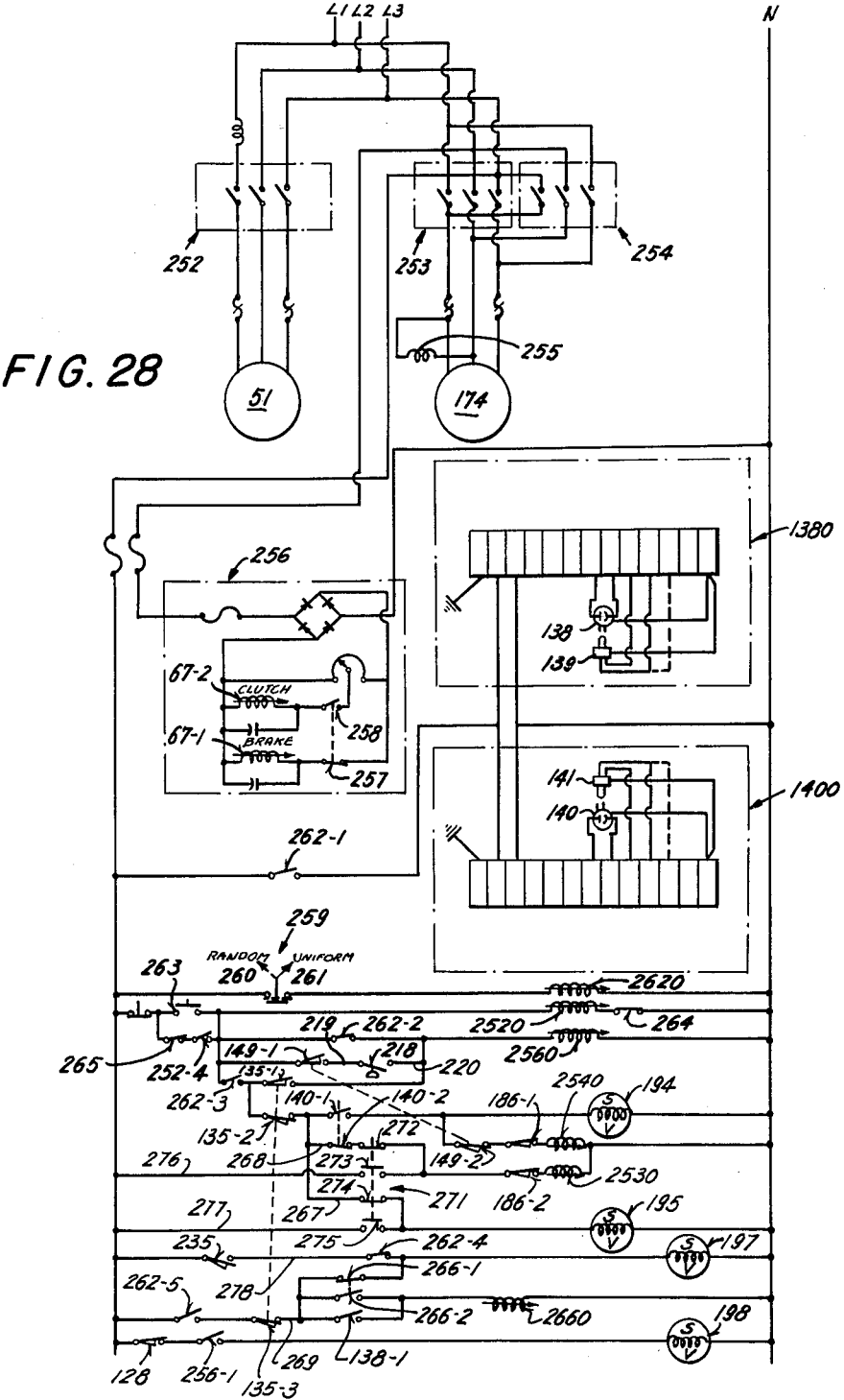

FIG. 27 is a diagrammatic view similar to FIGS. 25 and 26 of the pneumatic equipment for operating the carton guiding and clamping rail structure depicted in FIG. 2, the clamping means for its translating mechanism depicted in FIGS. 15 and 16, and clearance arm means shown in FIGS. 2, 12 and 13;

FIG. 28 is a schematic wiring diagram of the electrical circuitry of the machine depicted in FIGS. 1 to 27 inclusive;

FIG. 29 is a vertical section, with parts broken away, of a top portion of a typical open-top loaded carton with the bulk of the contents being such as to overfill slightly the carton before compacting, and illustrating that resulting bulging of folded front and back flaps prevent sharp folding of side flaps along their scored break lines; and FIG. 30 is an enlarged side elevational view, with parts broken away, of the flap folding head illustrated in FIG. 5 equipped with carton contents compacting means to assure depression of the folded front and back top flaps to the plane of the scored break line of the side flaps of the loaded carton of FIG. 29 (with a portion of the latter being shown herein) assuring solution of this over-filling problem.

Figure 3:
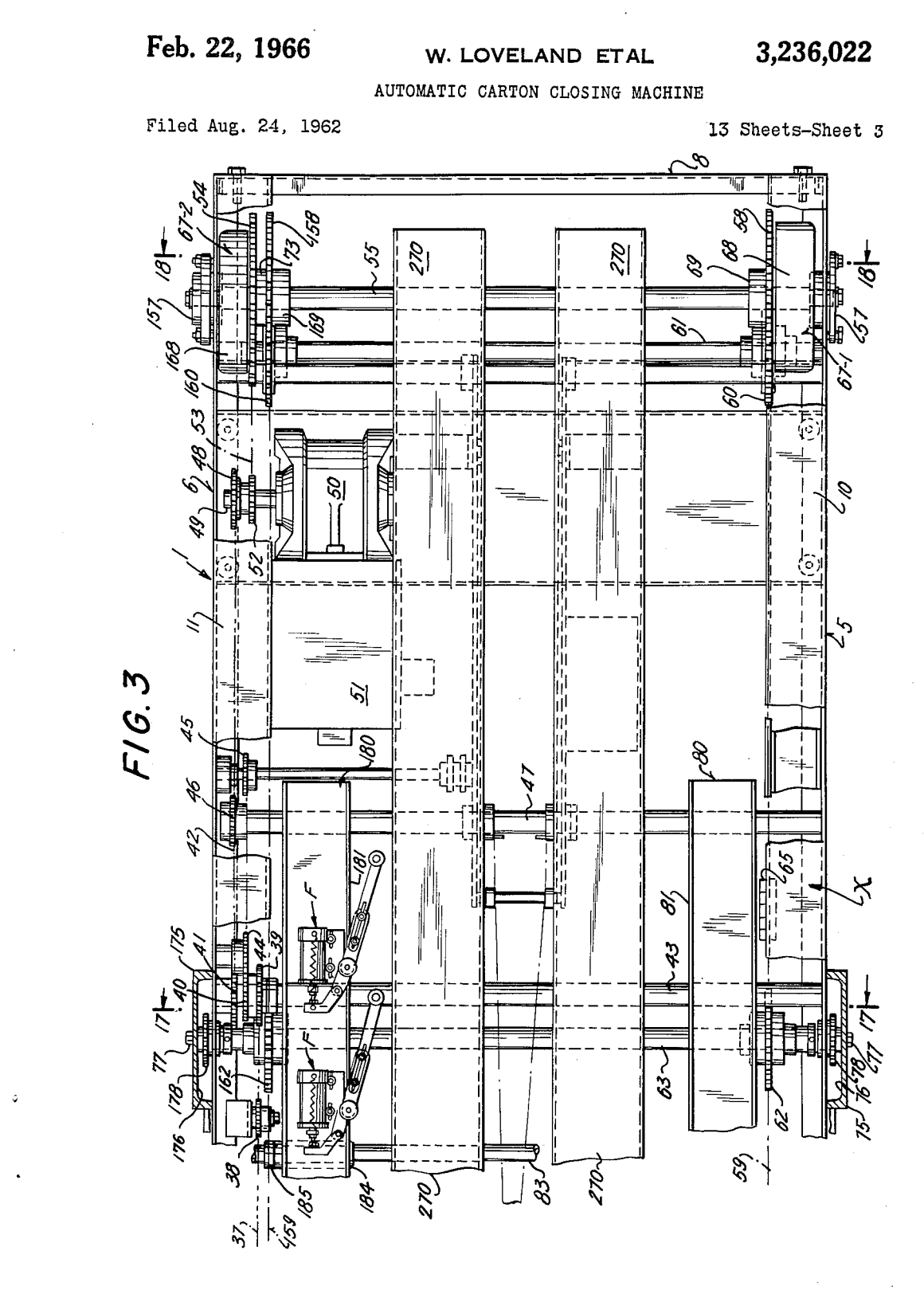

Referring to the drawings, in which like numerals identify similar parts throughout, it will be seen, and particularly from FIGS. 1, 2 and 3, that the embodiment of the automatic carton closing machine illustrated by way of example therein may comprise a bed unit 1 and an elevating head unit 2 supported on the former by upwardly-extending standards or columnar structure 3. Conventionally the parts of the machine are made of suitable metals. The bed unit 1 has a rectangular frame structure supported upon suitable legs 4. The frame structure may include opposed side walls 5 and 6, a relatively low end wall 7 at the entrance end, and another end wall 8 at the discharge end.

The bed unit 1 is equipped with lateral conveyor means suitably supported by the frame side walls 5 and 6, and this conveyor means has an entrance end in the vicinity of end wall 7 and a discharge end in the vicinity of end wall 8. This conveyor means defines a longitudinal path of forward carton travel along which it successively transports a plurality of open-top cartons. Such cartons are of conventional form being constructed, if desired, from corrugated board and rectangular in cross section with the edges of the top thereof provided with upwardly-extending front and back flaps respectively on the leading and trailing top edges and opposed upwardly-extending side flaps on the side top edges, all to be folded down to closed lateral lapping positions for securement in carton closing position. Ths machine of the present invention is designed automatically to close successively the tops of such cartons in this manner after they have been loaded with the products to be marketed or shipped therein. Accordingly, any suitable feeding means, such as a roller conveyor 9, illustrated in FIG. 1, will be mounted adjacent the entrance end of the bend unit 1, i.e., adjacent the end wall 7, successively to feed a supply of the loaded cartons over the top edge of the latter to the conveyor means. The frame structure of the bed unit 1 may include lateral sheet metal ledges 10 and 11 extending inwardly from the top edges of the side walls 5 and 6 for support of certain control devices as will appear hereinafter, and strengthening cross framing members may be embodied.

At the entrance end of the bed unit 1, in the vicinity of end wall 7, is mounted a liftable gate 12 shown in FIGS. 1, 2 and 12. A cross shaft 13, having its ends supported by side walls 5 and 6 of the frame structure, pivotally supports a pair of swinging arms 14 which carry on their back ends a gate bar 15. The gate bar 15 may be in the form of a length of angle stock having an upwardly-extending, carton-barring flange 16. The gate bar 15 preferably supports thereon a rotatable roll 17 over which the bottom of a loaded carton may advance readily after a leading portion advances thereover. It will be understood that when the gate arms 14 are swung upwardly, or in a clockwise direction as viewed in FIGS. 1 and 8, the gate flange 16 will swing up above the plane defined by the tops of the series of feed rollers 9 to bar the leading end of a carton bottom suppled across the latter until this gate flange is lowered below this feed plane.

As will be seen from FIG. 8, the means for lifting and lowering the entrance gate 12 may be in the form of a double-action pneumatic cylinder 18 and, as is illustrated schematicaly in FIG. 26, a pair of such pneumatic cylinders may be provided with each connected to one end of the gate bar 15. Each pneumatic cylinder 18 is provided with a piston 19 to opposite sides of which lead fluid conduits 20 and 21, which alternately serve as supply and venting passages for opposite ends of the cylinder chamber. It will be understood from FIG. 8 that the bottom end of each pneumatic cylinder 18 has a supporting arm 22 pivotally connected to a bracket 23 fixedly mounted to end wall 7 of the frame structure. The piston 19 of each pneumatic cylinder 18 is provided with a piston rod 24 coupled by a knuckle 25 to an arm 26 mounted to the gate bar 15. Thus, when pressurized air is fed to the top conduits 20 of the pneumatic cylinders 18, the pistons thereof will be retracted to lower the gate flange 16, with vent of the opposite end of the cylinders through the conduits 21. When pressurized air is supplied through the bottom conduits 21 of the pneumatic cylinders 18 with the top ends of the latter vented through the conduits 20, the gate bar 15 will be raised to lift the gate flange 16 to carton-barring position across the path of supplied cartons.

The conveyor means includes a continuously driven, initial endless section 27 indicated in FIG. 1 and seen in FIG. 2. For this purpose, an idling roller 28 is rotatably supported by a pair of arms 29 pivotally mounted on the cross shaft 13. A driving shaft 30 is rotatably supported by bearing units 31 between the frame side walls 5 and 6, and carries fixed thereto a driving roller 32. The initial conveyor section 27 preferably is in the form of an endless belt lapped about the rollers 28 and 32. As will be best seen from FIG. 1, a bottom run of the conveyor belt 27 is lapped back and forth about idling rolls 33 and 34 with the latter supported by tension adjusting devices 35. The shaft 30 carries a sprocket 36 fixed thereto to be driven by a drive chain indicated by dot-dot-dot-dash lines 37 in FIGS. 2 and 3. The endless driving chain 37 has a run lapped against a guiding idler 38 and is lapped about a driving sprocket 39. Driving sprocket 39 is one of a group of three thereof fixed together with the second 40 constituting means for driving tape feeding mechanism and the third 41 constituting the driving sprocket about which is lapped a driving chain indicated by dot-dot-dash lines at 42 in FIG. 3. The group of sprockets 39, 40 and 41 are rotatably supported by a cross shaft 43 and the tape feed sprocket drives tape feeding mechanism which constitutes no part of the present invention, comprising sprockets 44 and 45 about which an endless chain is lapped and a sprocket 46 against which the drive chain 42 is lapped in turn to drive a cross shaft 47 of tape feed mechanism. The endless chain 42 is lapped about a driving sprocket 48 fixed to a driving stub shaft 49 of a reduction gear unit 50 operated by a main driving electric motor 51. The driving stub shaft 49 also carries fixed thereto another driving sprocket 52 about which is lapped an endless driving chain indicated by dot-dash lines at 53 in FIG. 3, in turn lapped about a driven sprocket 54 rotatably supported by a cross shaft 55 equipped with suitable brake and clutch devices for drive of a second conveyor section as is explained hereinafter.

Figure 17:
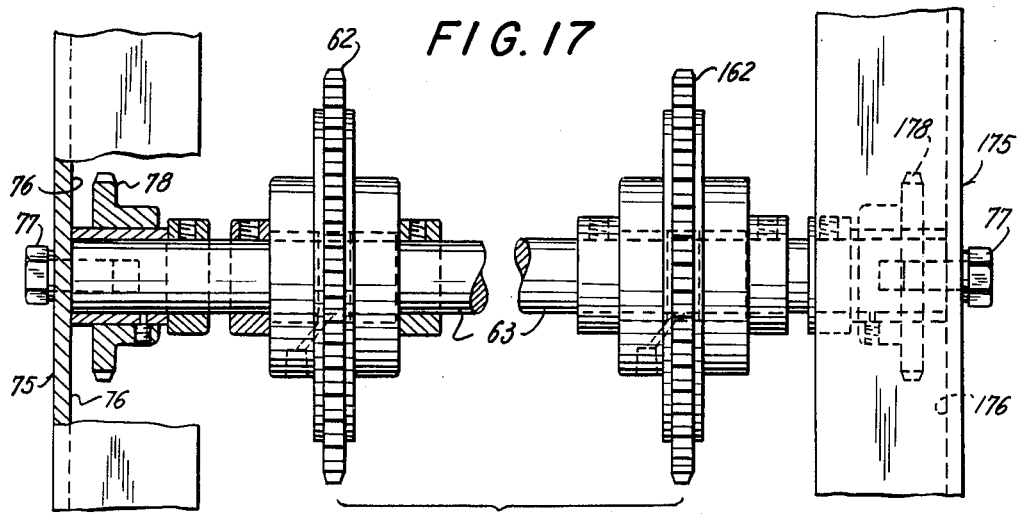
FIG. 17 is an enlarged detail, with parts broken away and in section, of sprocket equipment as viewed on line 17—17 of FIGS. 1 and 3.
Figure 18:
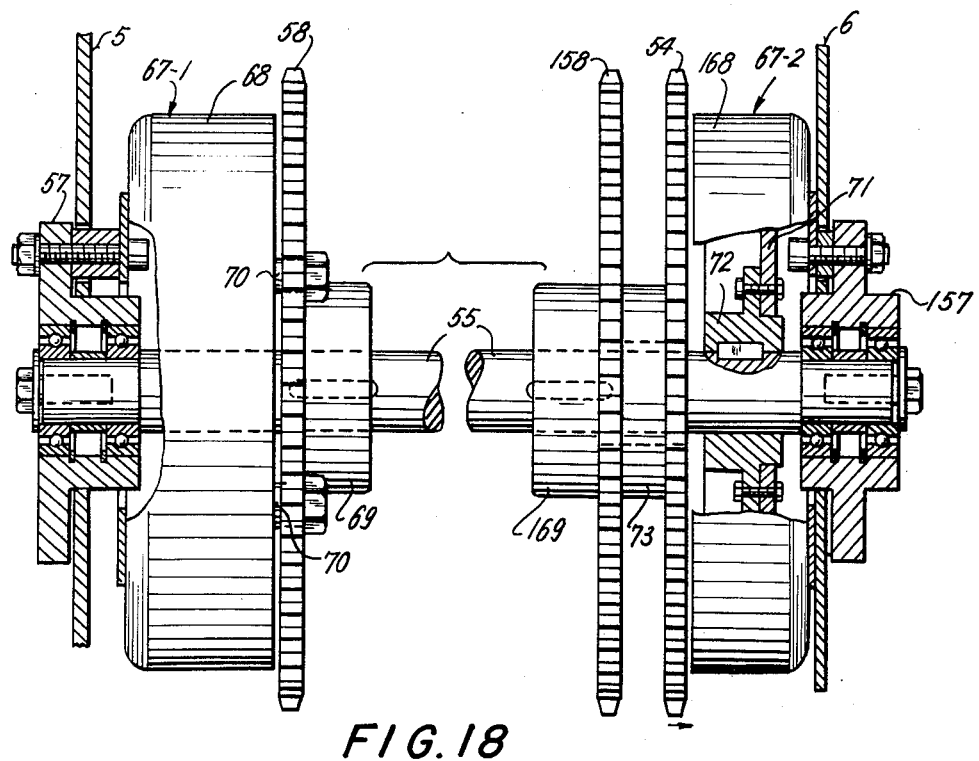
FIG. 18 is a view similar to FIG. 17 of clutch and brake mechanism as viewed on line 18—18 of FIG. 3.
Figure 23:
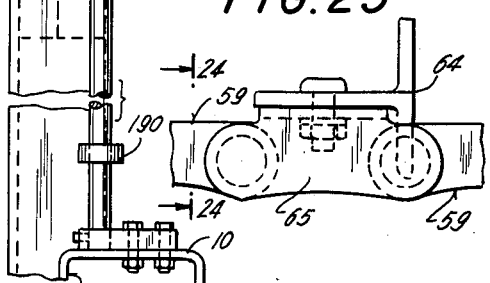
FIG. 23 is an enlarged detail of a flight bar of the second section chain conveyor of the machine, with parts broken away.
Figure 24:
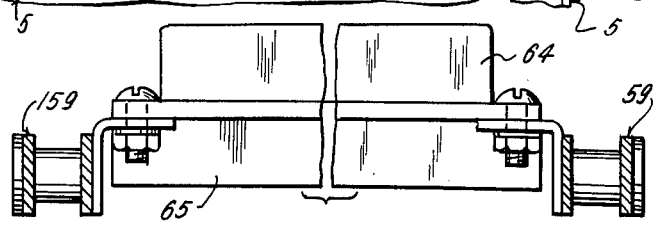
FIG. 24 is a sectional view taken substantially on line 24—24 of FIG. 23 with parts broken away and others shown in elevation.

Cross shaft 13 also carries, rotatably supported thereon, a pair of near and far idler sprockets 56 and 156, as will be seen in FIG. 2, while cross shaft 55 is rotatably supported by bearing units 57 and 157 carried by frame side walls 5 and 6, as will best be understood from FIG. 18. Drive shaft 55 carries fixed thereto a pair of near and far sprockets 58 and 158 respectively aligned with sprockets 56 and 156. The second endless conveyor section preferably is in the form of a pair of endless chains, indicated by dot-dash lines 59 and 159 in FIGS. 2 and 3, respectively lapped about sprockets 56 and 58, and 156 and 158, for drive by sprockets 58 and 158. As will be best understood from FIG. 1, the lower run of each of the endless chains 59 and 159 is lapped beneath one of a pair of idlers 60 and 160 rotatably supported by a cross shaft 61 mounted between frame side walls 5 and 6, and beneath another of a pair of idlers 62 and 162 rotatably supported by another cross shaft 63 shown in FIG. 17. The second endless conveyor section also includes a series of carton transporting flight bars 64 which, as is indicated in FIG. 1, may be four in number spaced longitudinally appreciably apart. As is indicated in FIGS. 23 and 24, each flight bar 64 may be in the form of an upstanding flange supported by a saddle 65 to which are connected links of the conveyor chains 59 and 159. The pair of conveyor chains 59 and 159 also carry a plurality of reversed flight bars 164 which may be similar to the flight bars 64 and incorporated in the endless chains in a manner similar to that illustrated in FIGS. 23 and 24. There may be a pair of the reversed flight bars 164, and each constitutes a carton stop having the function of holding a carton at a sensing station when the second conveyor section pauses or is held in stop position, as will be understood from the operation described hereinafter. The endless conveyor chain 59 on the near side, as viewed in FIG. 1, also is equipped with a plurality of tripping lugs 66–1 and 66–2 to be carried along therewith for operating certain limit conveyor means described hereinafter, and there may be a pair thereof each associated with one of the carton stop flight bars 164.

It will thus be seen that the initial conveyor section comprising endless belt 27 has an entrance end near the vicinity of the selector gate 12 and a discharge end at a point appreciably in advance thereof which, as will be explained later, is at a carton sensing and flap folding station. From the discharge end of the initial conveyor section or belt 27 suitable fixed carton-supporting structure extends forward, and this may be in the form of a pair of fixed rails 270 suitably supported between the frame side walls 5 and 6 and terminating in the vicinity of the discharge end wall 8, as will be seen from FIGS. 2 and 3. It will also be understood therefrom that the second conveyor section comprising conveyor chains 59 and 159 and their flights 64 extend forward at least from the discharge end of the belt conveyor 27 to the discharge end of the bed unit 1. As will be apparent from FIG. 2, preferably the entrance end of the chain conveyor appreciably laps the discharge end of the belt conveyor and, in fact, has its chain-supporting front sprockets 56 and 156 rotatably supported on the same cross shaft 13 which pivotally carries the arms 29 rotatably supporting roller 28 about which the entrance end of the conveyor belt 27 is lapped. Thus, any carton which is delivered to the sensing and flap folding station by the conveyor belt 27 will be picked up there by an oncoming flight 64 of the chain conveyor to be slid forward over the rails 270 to the discharge end of the bed unit 1.

The near end of driven cross shaft 55 carries a housed magnetic brake 67–1 and the far end thereof carries a housed magnetic clutch 67–2, both of which may be of conventional construction. For example, the frame side wall 5 may fixedly support through fixed housing 68 of the brake unit 67–1 fixed field coils and core structure thereof opposed to an axially slidable armature therein. Hub 69 of drive sprocket 58 is keyed to the drive shaft 55 and the sprocket in turn carries circumferentially-spaced, axially-extending pins 70 on which is slidably mounted for axial motion the armature, which may be in the form of a paramagnetic disc (hidden in housing 68). The fixed core structure is annular and has a friction face equipped with suitable brake lining material opposed to a face of the slidable armature plate, so that when the brake field coil is energized the armature plate is drawn axially against the brake lining of the fixed magnetic core structure to clamp it thereto and prevent the driven cross shaft 55 from rotating. The clutch unit 67–2 is of somewhat similar structure with the field coil thereof also fixedly supported by housing 168 therewithin, which is in turn fixedly mounted to the frame side wall 6. The annular core structure, a portion of which is seen at 71 in FIG. 18, is carried by a hub 72 keyed to the driven shaft 55. While the hub 169 of sprocket 158 is also keyed to the driven shaft 55, the drive sprocket 54 has its hub 73 freely supported on this shaft for relative rotation and axial motion toward the keyed core structure 71, and sprocket 54 may be constructed of paramagnetic material to serve as the annular armature. Thus, when the field coil of the clutch unit 67–2 is energized, the drive sprocket 54 will be slid axially outward a short distance to have its outer face engage a friction facing of suitable material carried by the annular magnetic core structure 71 keyed to the shaft, to connect the shaft and the conveyor chain driving sprockets 58 and 158 keyed thereto to the shaft drive sprocket 54. Since the magnetic brake and clutch units 67–1 and 67–2 are of conventional construction, further structural details thereof are not necessary to an understanding of their functions and operations, and they are alternately operated or energized for alternate periodic drive and pause of the chain conveyor section.

As will be understood from FIGS. 1, 3 and 17, the support structure 3 includes an opposed pair of upwardly-extending standards or columns 75 and 175 which constitute supports for the elevating head unit 2, and these columns are fixedly mounted to the frame side walls 5 and 6 of the bed unit 1 in any suitable manner. The columns 75 and 175 preferably are of channel construction so as to provide guiding channels 76 and 176 for head-supporting slides or carriage means therein, and to house elevating mechanism. Opposite ends of the cross shaft 63 extend into the channels 76 and 176 and are fixedly mounted to these columns by any suitable means, such as stud bolts 77. Within the channels 76 and 176, fixed cross shaft 63 rotatably supports sprockets 78 and 178, forming a part of head elevating mechanism, as is explained here following.

As will be understood from FIGS. 2, 3 and 9 to 14 incl., the bed unit 1 is equipped with suitable carton clamping and carton travel guiding means, preferably extending from the vicinity of the entrance end to a distance short of the discharge end of the bed 1, but entirely through the carton sensing and flap folding station in the vicinity of the discharge end of the initial conveyor section or belt 27. This carton clamping and guiding structure may be in the form of a pair of rails 80 and 180, which may be of channel formation, as shown, to provide on the inner sides thereof opposed upstanding flanges 81 and 181. As will be understood from FIGS. 2, 3 and 14, the clamping and guiding rails 80 and 180 are suitably supported by a pair of transverse rods 82 and 83 mounted to the frame side walls 5 and 6. Each of the rods 82 and 83 supports a pair of slides 84 and 184 carrying bracket arms 85 and 185 to each of which is mounted one of the rails 80 and 180, as will be best seen in FIG. 14. Thus, the guiding and clamping rails 80 and 180 are slidably supported on transverse rods 82 and 83 for transverse movement inward and outward relative to the center of the path of carton travel defined by the longitudinally-extending conveyor means. In their outward positions, depicted in FIGS. 2 and 3, the rails 80 and 180 are at their initial carton-receptive positions to permit a carton feed over depressed gate 12 to the entrance end of the initial conveyor section belt 27 to advance therebetween. The front end of each of the rails 80 and 180 preferably is equipped with a freely rotating carton guide roller 86 to facilitate entrance of a carton therebetween.

The clamping and guiding rails 80 and 180 are slid transversely back and forth on the guide rods 82 and 83 by suitable driving mechanism. Such rail driving mechanism may be in the form of a fluid pressure motor, such as a pneumatic cylinder 87 of the double-action type having its piston head 88 equipped with a through piston rod 89, as will be best understood from FIG. 27. The rail driving mechanism includes lateral sprockets 90, 91, 92, 93, 94 and 95. Sprockets 90 and 92 are supported on frame side wall 5 by a bracket 96 while sprockets 93 and 95 are supported by a similar, reversely-shaped bracket 196. Sprocket 91 is supported on side wall 6 by a bracket 97 and a bracket 98 is employed to support sprocket 94 on the latter side wall, as will be understood from FIGS. 2 and 14 to 16 inclusive. Lengths of link chain are lapped about the sprockets 90 to 95 incl. and anchored to opposite ends of the piston rod 89, with suitable connections to the slides 84 and 184 to drive the rails 80 and 180 transversely inward and outward. For example, a length 99 of such link chain is anchored to the right end of piston rod 89 as viewed in FIG. 2 and lapped about sprocket 90 to extend transversely to an anchor bolt 100 carried by slide 184 on slide rod 83. Slide 184 also carries another chain anchor bolt 200 to which one end of another chain length 199 is anchored, with the latter lapped about sprocket 91 to extend transversely back to another anchor bolt 300 carried by slide 84 on slide rod 83. The latter slide 84 also carries an additional anchor bolt 400 to which a third length 299 of the chain is connected, with the latter lapped about sprocket 92 to extend longitudinally back for lap about sprocket 93 and then transversely to a fifth anchor bolt 500 carried in like manner by slide 184 on slide rod 82. This slide 184 also carries another anchor bolt 600 to which a fourth length of chain 399 is anchored and then lapped about sprocket 94 to extend transversely back to an additional anchor bolt 700 carried by slide 84 on slide rod 82, with a further anchor bolt 800 on the latter slide having connected thereto a fifth length of chain 499 lapped about sprocket 95 to extend longitudinally forward to connection with the left hand end of the piston rod 89. Thus, when the piston rod 89 of the pneumatic cylinder 87 is slid longitudinally to the right, as viewed in FIG. 2, the clamping and guiding rails 80 and 180 are driven transversely outward to their initial carton-receptive positions shown therein, and when the piston rod is then reciprocated in the opposite direction to the left in FIG. 2 these rails are driven transversely inward toward each other for approach of their inside flanges 81 and 181 to opposite sides of a carton delivered therebetween.

Referring to FIGS. 15 and 16, it will be seen that a clamping device is provided in association with the sprocket 94, to hold the guiding and clamping rails 80 and 180 in an adjusted position, such as the initial retracted position illustrated in FIGS. 2 and 3. Such clamping means may include another pneumatic cylinder 101 of the double-action type, as is also indicated in FIG. 27, having its piston head 102 carried by a piston rod 103 which exteriorly of the cylinder is connected to or abutted against an arcuate clamping shoe 104. The arcuate clamping shoe 104 is slidably mounted on a pair of rods 105 supported by head structure 106 of the pneumatic cylinder, with the latter in turn supported by a bracket 107 mounted to frame side wall 6. The guide rods 105 carry on the far ends thereof a fixedly mounted arcuate clamping shoe 108 in opposed relation to the shoe 104. Cylindrical hub 109 of the sprocket 94 is located between opposed arcuate faces 110 and 111 of the clamping shoes 104 and 108, so that when the latter are forced toward each other by feed of pressurized fluid or air to the cylinder 101 by way of conduit 112 behind the piston head 102, this sprocket is clamped in stop position to hold the rails 80 and 180 in their relative adjusted positions. The space in the cylinder 101 ahead of the piston 102 is vented through conduit 113 when pressurized air is fed to the space therebehind by conduit 112, and when the functions of these conduits are reversed the pressurized air is fed to the space in front of the piston head to retract the clamping shoe 104 and free sprocket 94, so as to permit pneumatic cylinder 87 to adjust the relative positions of the rails 80 and 180 by transverse drive.

The front end of guiding and clamping rail 180 carries opposite the belt conveyor section 27, in the area of the carton sensing and flap folding station clearance means 114 and an adjustable control or sensing device 115, as will be seen in FIG. 2. The clearance means 114 is in the form of a pivoted arm 116, details of which are shown in FIGS. 12 and 13. A section of the inward side flange 181 of rail 180 is cut out and clearance arm 116 is pivotally supported at 117 therein, with its free end 118 extending in the direction of carton forward travel. In order to actuate the clearance arm 116 from a retracted full line position, shown in FIGS. 2 and 13 by swinging it inward away from the rail a fraction of an inch to the dot-dash position, a third pneumatic cylinder, of the single action type, 119 is provided on the rail. As is indicated in FIG. 13, the outer side flange 281 of rail 180 swivelly supports the back end 120 of the pneumatic cylinder 119, and the piston head 121 (shown in FIG. 27) carries a piston rod 122 connected by a knuckle 123 to the back side of the free end 118 of the clearance arm 116. Thus, when pressurized air is fed to the back end of cylinder 119 by conduit 124 the piston head 121 and its piston rod 122 are thrust forward to swing free end 118 of the clearance arm 116 inward to the dot-dash position. The clearance arm 116 may be retracted toward its full line position upon discontinuance of feed of the pressurized air to the back end of cylinder 119, as a result of resistive force applied thereto by contact with a carton side wall when the carton is clamped between the rails 80 and 180 at this point. If desired, such retraction of the clearance arm 116 may be more positively or fully attained by mounting a helical compression spring about the piston rod 122 within the head space of the cylinder 119 in front of the piston head 121. The advantage attained by the provision of the clearance arm 116 is more fully explained here following in connection with a description of a typical operation of the machine.

For the purpose of supporting the adjustable control 115 upon the guiding and clamping rail 180, the latter carries a pair of opposed brackets 125 (see FIGS. 2, 9, 10, and 11). The brackets 125 support therebetween a pair of longitudinally-extending guide rods 126 and 226 upon which a carriage 127 is slidably mounted. Carriage 127 supports a control device 128, which may be in the form of an electrical circuit switch biased to one of its open and closed positions and manipulated to the other thereof by an actuating arm 129. As will be best understood from FIGS. 2 and 11, the switch actuating arm 129 is elongated and extends longitudinally forward while having its mid-section shaped to be disposed substantially parallel to the inward face of flange 181 of rail 180 when retracted or swung back by contact with carton side structure. Thus, when the rails 80 and 180 are driven inward toward each other with a carton disposed therebetween opposite the control 115, the back side of the carton which is opposed to the switch operating arm 129 will first be contacted thereby. Then, as the rails 80 and 180 are brought to clamping positions against the opposite sides of the carton, this switch operating arm 129 will be retracted or pushed back to the position of FIG. 11 to operate the switch 128. The control device comprising switch 128 and its actuating arm 129 are automatically adjustable along the path of carton forward travel as dictated by the width of the carton. For example, a narrow carton causes the clamping rails 80 and 180 to be driven inward toward each other and appreciable distance and the control device 128 will be advanced forward an appreciable distance. With wider cartons, where inward travel of the clamping rails 80 and 180 is relatively small, the control device 128 will be advanced forward only a short distance. This automatic adjustment of the position of the control device 128 is attained by substantially rigid tie means pivotally connected to the fixed structure of the bed frame and to the control carriage 127. For example, elongated rigid arm or strap 130 is pivotally mounted at 131 to a channel 132 fixedly supported by bed frame wall 6, with its other end pivotally connected at 133 to the carriage 127, as will be understood from FIGS. 2, 10 and 11. Thus, as rail 180 is driven transversely inward toward the center of the longitudinal path of carton forward travel, the tie 130 is swung counterclockwise to pull the control carriage 127 forward along the guide rods 126 and 226. This forward adjustment of the position of the control device 115 is proportionate to the width of the carton at the carton sensing and flap folding station, and this forward adjustment action, as well as the retraction of the actuating arm 129, is illustrated in FIG. 11, wherein a side wall portion of a carton is indicated at 134 to which is abutted inner side flange 181 of rail 180 with the actuating arm 129 retracted for alignment of its mid-portion therewith.

The bed unit 1 also is provided with additional control equipment. As will be seen from FIG. 1, the frame of the bed unit 1 supports a limit control 135, which may be in the form of electrical circuit switching means having a plurality of switches mechanically linked together for simultaneous operation. The limit switch 135 is provided with an actuating trigger 136 designed to be swung up and down and biased to its downward position with a drag roller 137 carried by its lower end. Limit switch 135 preferably is supported upon ledge 10 beyond the head-supporting up-right column 75, such as in the vicinity of the location "X" indicated in FIG. 3, so that the roller 137 on the actuating trigger 136 will be dragged over the next oncoming traveling lug 66–1 or 66–2 carried by conveyor chain 59. When the upper run of conveyor chain 59 in its forward travel causes lug 66–1 to engage the trigger 136, the latter will be swung up to actuate the switches in the limit switch unit 135, and the circuit switches thereof will be held to their respective manipulated positions until this run of the conveyor chain advances sufficiently to free the trigger and thus permit the limit switches to be returned to their initial positions. The limit switch unit 135 is provided for "Random" operation of the machine, i.e., to close random size cartons. For operation of the machine to close uniform size cartons, it may be set to a "Uniform" setting, as explained hereinafter, and, for this purpose, the machine will be equipped with another limit switch unit of a construction similar to that at 135 except for the number of circuit switches controlled thereby. This second limit switch unit preferably is supported on the opposite ledge 11 substantially opposite to the location of limit switch unit 135 on ledge 10, with its actuating trigger depending for drag against a plurality of lugs carried by conveyor chain 159, and with each associated with one of the flights 64, as hereinafter explained.

The clearance lever 116 and the switch actuated arm 129 constitute physical sensing devices for contact with the side of a carton at the sensing station. Additional sensing devices are provided on the bed unit 1, which may be in the form of optical carton sensing devices. For example, as will be seen from FIGS. 1 and 2, the ledge 10 may support at 138, in the vicinity of the selector gate 12 and slightly in advance thereof a photo cell responsive to the light beam from a light source 139 supported on the opposite side by ledge 11. At the sensing and flap folding station, preferably opposite the clearance means device 114 ledge 10 may support in similar fashion, substantially at the point 140, a second photo cell arranged opposite to a second light source for response to the beam thereof, with the latter being located substantially at the point 141. The functions of the photo cells at 138 and 140 will be explained in connection with the wiring diagram of FIG. 28 and the operation of the machine detailed hereinafter.

In FIG. 1 is shown in dot-dash lines an open-top carton "Y" located opposite the photo cell optical sensing device 140 at the sensing and flap folding station, beneath a flap folding and carton closing head 142 supported for elevating travel upon the upright columns 75 and 175. Head 142 includes a lateral frame member or beam 143 from which depends a post 144, as will be understood from FIGS. 1, 4, 5 and 7. The bottom end of depending post 144 pivotally carries at 145 a front flap folding arm structure 146, which, due to gravity biasing, normally depends from the top elevated position of the head 142 shown in FIG. 1 obliquely down and forward to the full line position shown in FIG. 1, and the dot-dash position shown in FIG. 5. The front flap folding arm structure 146 carries a finger 147 which engages a trigger 148 of another limit control, which may be an electrical circuit switch device 149 supported on the post 144. In the full line position of the front flap folding arm structure 146 shown in FIG. 1 its finger 147 holds the switch trigger 148 forward to a tripped position to hold the switch in one of its open and closed positions. When the front flap folding arm structure 146 is swung upward to a lateral position, indicated in FIG. 1 in dot-dash lines and in full lines in FIG. 5, the trigger 148 of switch 149 is released to permit the switch to be actuated to the other of its two positions. The bottom of the depending post 144 has anchored thereto, such as by welding, one end of a folded flap hold-down device in the form of a resilient presser strip 150, which extends forward with its free end unsupported, to cooperate with the front flap folding arm structure 146. As will be seen from FIGS. 1 and 5, the flap hold-down strip 150 may have a continuating portion at its anchored back end, which is turned up obliquely and then inward to additional anchorage to the depending post 144, so as to provide a wedge-shaped stop 250 for a back flap folding arm or kicker hereinafter described.

The elevating flap folding head 142 also may have a forwardly extending lateral frame member "A" which supports suitable flap securing mechanism, which may be tape applying means of the type disclosed in our above-identified copending patent application Serial No. 139,676, including pairs of wipe down arms "B" and "C," to which are supplied from a suitable tape supply reel "D" lengths of gummed tape to be adhesively affixed over overlapping flaps of a carton top after the flaps have been folded down in stacked or overlapping relation. Since operation of the present machine is not limited to the employment of type applying mechanism as means to secure the overlapped flaps together, no further details of this part of the flap folding head 142 need be here recited. This is likewise true with respect to similar tape applying devices carried by the bed unit 1, including another adhesive tape supply reel "E" (see FIGS. 1 and 2), tape feed and drive sprockets 40, 44 and 45, tape mechanism cross shaft 47 and its drive sprocket 46, tape feed actuators "F" (supported on rail 180, see FIG. 3) and associated structure not herein described, since such tape supplying and applying means form no part of the present invention.

It will be seen from FIGS. 5, 6 and 7 that the front folding flap arm structure 146 preferably is bifurcated or in the form of a fork between the furcations or tines of which is located a lateral projection 152 supported on the bottom end of depending post 144 and carrying on its front end a spring-biased detent 153. One furcation 246 of the fork 146 carries a slidable latch plate 154 which is cut back, as shown in FIG. 6, to provide a nose 155, which will be engaged above the spring biased latch in the lateral full line position of the front flap folding arm seen in full lines in FIG. 5, upon the latch plate being manually slid or retracted toward the pivot point 145. By this means the front flap folding arm 146 is latched to its lateral or horizontal position for "Uniform" carton size operation.

The lateral frame member or beam 143 of head 142 pivotally supports at 151 a carton back flap folding arm or kicker 161, as will be seen from FIGS. 1 and 4. The back flap folding arm or kicker 161 is normally held in an extended or substantially lateral position when the flap folding head 142 is elevated to the maximum height of its vertical travel, as is shown in FIG. 1. For this purpose the lateral beam 143 carries a kicker actuating means, preferably in the form of a pneumatic cylinder 163, as is shown in FIGS. 1 and 4 and diagrammatically illustrated in FIG. 25. This pneumatic cylinder 163 is of the double-action type with pressurized fluid being alternately fed to opposite ends on opposite sides of its piston head 164 by suitable conduit means, such as 165 and 166. Piston rod 167 connected to piston head 164 of the pneumatic cylinder 163 is connected by a knuckle 170 to a lever arm 171 fixed to the hub of the pivoted kicker 161, as will be seen from FIG. 4. Thus when pressurized air is supplied to the back end of pneumatic cylinder 163 through conduit 166, the rear flap kicker 161 is swung backward and upwardly to its substantially lateral cocked position, shown in FIG. 1, with the head space of the cylinder in front of piston head 164 being vented by conduit 165. It will be seen from FIG. 1 that the bottom side of the rear flap kicker 161 is provided with a depending tapered nose 172 having an oblique rear face 173-1 which, when the kicker is swung down to its depending position indicated in dot-dash lines in FIG. 1, is oriented to substantial parallelism with the oblique stop 250. The cocked kicker 161 is swung down to this position to engage or strike the rear face of an upstanding back flap on the trailing end of the open top of a carton and kick it forward to folded lateral position by reversing the pneumatic connections to cylinder 163, i.e., by supplying pressurized fluid or air to conduit 165 and venting through conduit 166, to retract the piston rod 167. When the kicker 161 is swung down the oblique rear face 173-2 of its tapered nose 172 provides a flat lateral bottom surface substantially in the horizontal plane of the bottom surface 146-1 of front flap folding arm structure 146 when swung up, as are indicated in dot-dash lines in FIG. 1. These aligned bottom surfaces of the flap folding arms 146 and 161 maintain the folded front and back flaps in a common lateral plane during forward transport of the carton which effects the folding down of the side flaps.

Figures 19, 20:
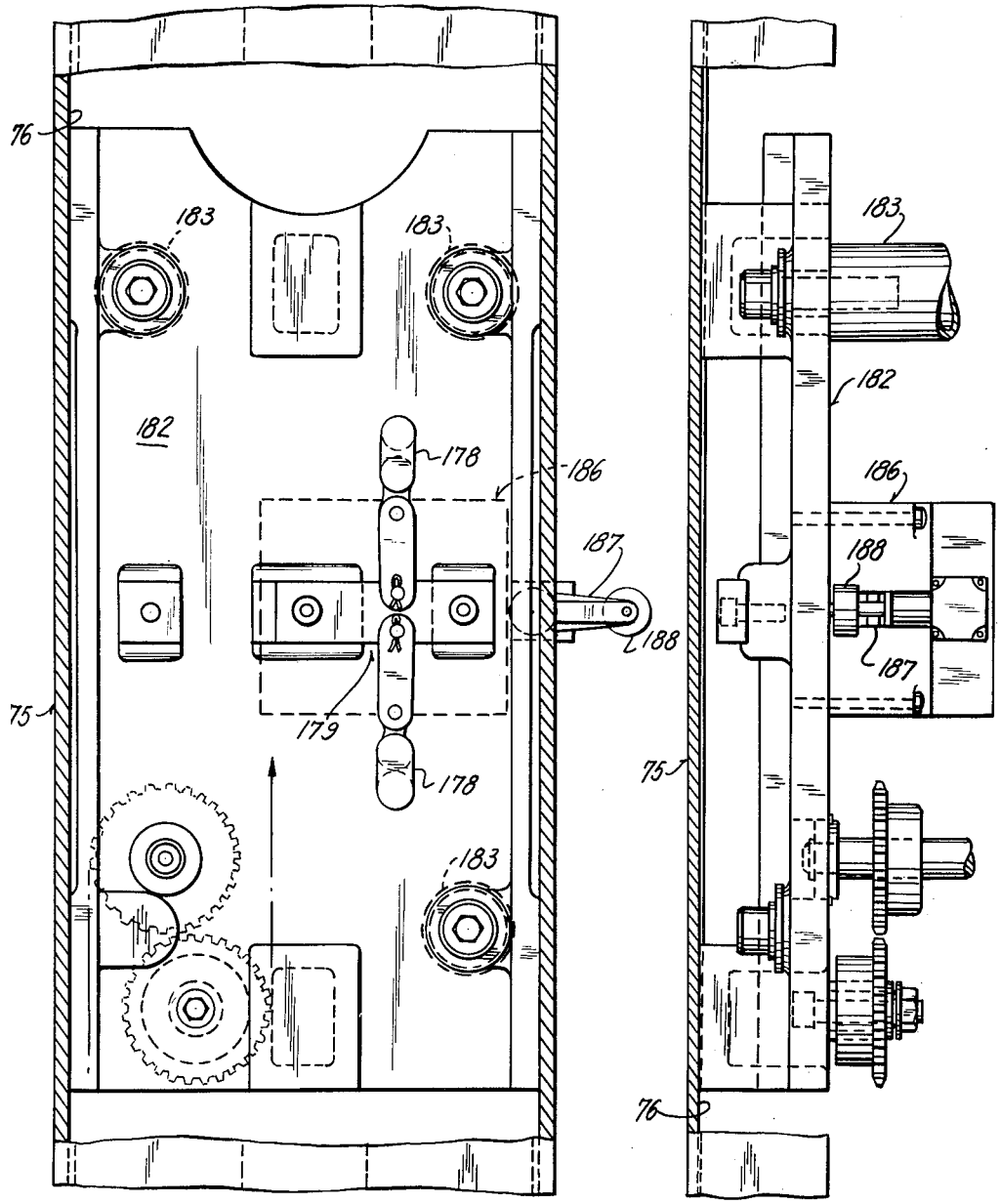
FIG. 19 is an enlarged side elevational view, with parts broken away and in section, of the near side flap folding head supporting column and the support slide mounted therein.
FIG. 20 is an elevational view, with parts broken away and in section, of the back edge of the structure shown in FIG. 19.
Figure 21:
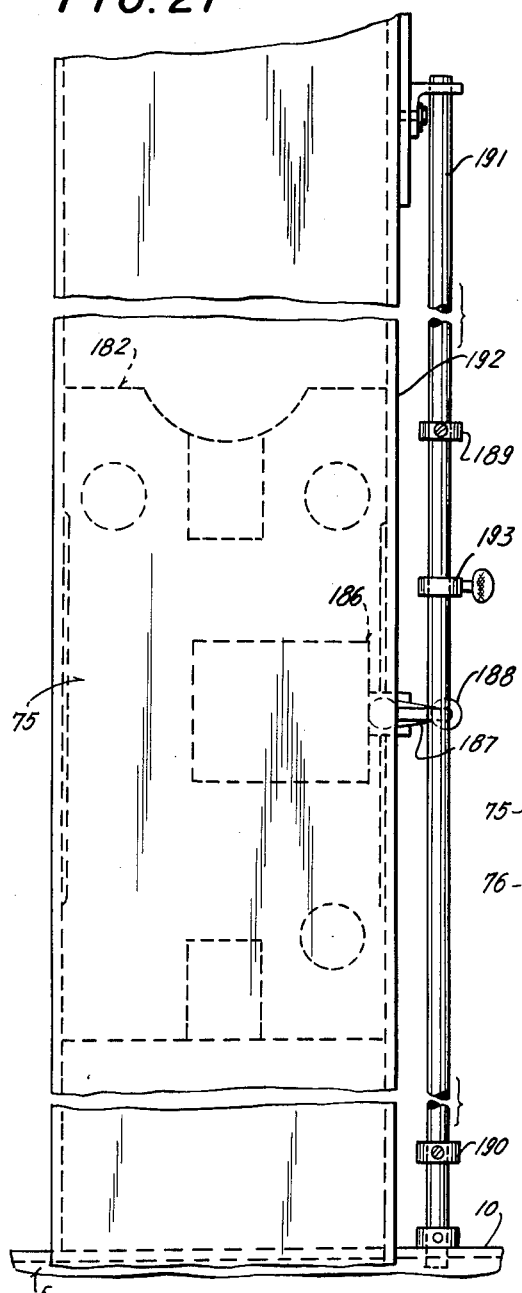
FIG. 21 is a side elevational view, with parts broken away, of the near side column shown in FIGS. 19 and 20 and depicting certain limit switch mechanism thereof which dictates the maximum and minimum vertical travel of the flap holding head.
Figure 22:
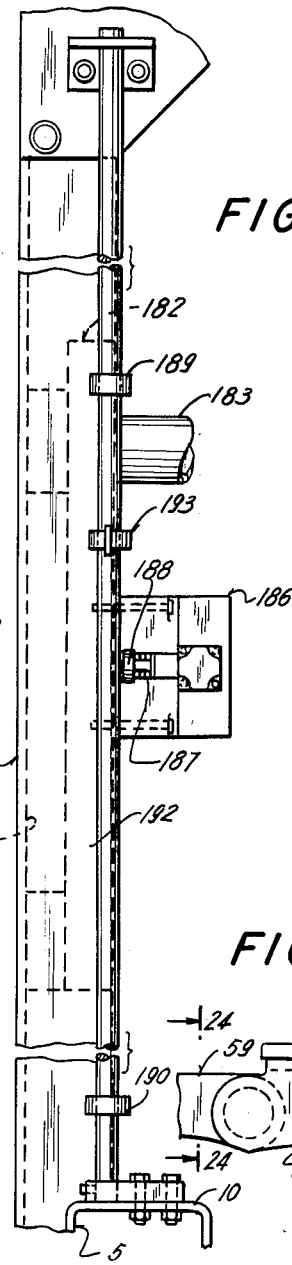
FIG. 22 is a back elevational view, with parts in section, of the structure shown in FIG. 21.

The top of the column 75 and 175, which support the head 2 for vertical reciprocation, fixedly support at their top ends a reversing electric motor 174, as is indicated in FIG. 1. The drive of reversing motor 174 is suitably geared to a pair of top drive sprockets 177 and 277 carried by the top ends of the columns 75 and 175. Drive chain 178 is lapped about drive sprocket 177 in the vicinity of the top end of column channel 75 and about the bottom idler sprocket 78, shown in FIGS. 3 and 17, with opposed ends thereof anchored by suitable means at 179 to a slide 182 riding up and down in channel 76, as will be understood from FIG. 19. In similar fashion, a like chain (not shown) is lapped about the far top sprocket 277 and bottom idler sprocket 178, and is anchored in like fashion to a similar slide of reversed form located in channel 176 of column 175. The opposed pair of slides (including that shown at 182 in FIGS. 19 and 20) are suitably tied together to act as a carriage unit, such as by a plurality of tie rods or tubes 183, one of which is shown in FIG. 20, and the locations of which are indicated in FIG. 19. The carriage comprising the pair of slides 182 and its companion suitably support the lateral frame member or beam 143 for vertical travel down and up therewith. Thus, when the reversing vertical travel motor 174 is driven in one direction the entire head structure 2 is lowered to position its flap folding means above an open top carton at the sensing and flap folding station, such carton being indicated at "Y" in FIG. 1, and when driven in the opposite direction will lift this head structure to its initial elevated position, such as that indicated in full lines in FIG. 1.

Maximum limits of up and down motion of the head structure 2 are dictated by suitable limit means, which may be in the form of switch means in electrical circuitry of the reversing motor 174. Such switch means may be of the double-throw type so as alternately to open the energizing circuits of the reversing motor 174 to limit the down and up drive thereof. Such reversing motor control switch unit is shown in FIGS. 19 to 22 incl. at 186 suitably mounted on slide 182. Switch unit 186 is provided with a double-action actuating trigger 187 carrying a roller 188 arranged to be abutted in its up and down travel to top and bottom stop collars 189 and 190, fixed upon a vertical control rod 191 supported by bed unit frame ledge 10 and the back edge flange 192 of column channel 75, as will be seen from FIGS. 21 and 22. The vertical control rod 191 also preferably carries an additional stop collar 193, which may be adjusted in its elevational position by its set screw in the form of a wing screw, as shown therein. Thus adjustable collar 193 may serve to dictate the top limit of lift of the head structure 2. The bottom stop collar 190 will limit lowering of the head structure 2, so as to assure that no parts thereof will be driven down to jam against any of the bed unit structure should the down energizing circuit of the reversing motor 174 accidentally be closed in the absence of a carton at the sensing and flap folding station, thus being provided as a safety measure.

The gearings shown in FIGS. 19 and 20 as being carried by the carriage slide 782 forms part of the tape supply mechanism for cooperation with the tape applying means "B" and "C" carried by the arm "A" of the head structure 2, and thus need not be herein described.

It will be understood by the diagrammatic showings in FIGS. 25, 26 and 27 that pressurized fluid, such as air, is supplied to the various actuating pneumatic cylinders 18, 87, 101, 119, and 163 through suitable flow control solenoid valves, preferably of the four-way type, so that paths of flow may be reversed alternately. As is indicated in FIG. 27 the pneumatic system in which the rail operating cylinder 87, the reel driving mechanism stop clamp cylinder 101, and the clearance arm operating cylinder 119 are located, are controlled by such four-way solenoid valves 194 and 195. The selector gate operating cylinders 18 are controlled by such a four-way solenoid valve 197, as is indicated in FIG. 26; and the back flap folding kicker operating cylinder 163 is controlled by such a four-way solenoid valve 198.

As will be seen from FIG. 25, pressurized air fed through a supply conduit, indicated at 201, may upon energization of four-way solenoid valve 198, be passed straight through to conduit 165 and to the head end of cylinder 163 to retract the piston rod 167, so as to swing the back flap folding kicker 161 down from cocked position, with the opposite end the cylinder 163 being vented to exhaust through conduit 166 and flow back straight through the solenoid valve 198. When four-way solenoid valve 198 is de-energized, the passages therethrough are cross-connected so that supply conduit 201 is thus communicated along the path 202 through the valve to the conduit 166, with cross communication of conduit 165 along the path 203 to the venting port, so as to cause the piston rod 167 to be thrust outwardly for swinging the depending back flap folding kicker 161 from its down position, indicated by dot-dash lines in FIG. 1, up to the cocked full line position thereof.

As will be seen from FIG. 26, when pressurized air ins fed through supply conduit 204 with the four-way solenoid valve 197 energized it passes straight through to a conduit 205 connected to the common conduit 20 so as to supply the air to the top ends of the gate retracting cylinders 18, with venting of their bottom ends through the common conduit 21, conduit 206 connected to the latter and back straight through the solenoid valve to exhaust. When the solenoid valve 197 is de-energized it cross-connects the supply conduit 204 and the exhaust port with the conduits 206 and 205 respectively by way of paths 207 and 208 through the valve.

The pneumatic system diagrammatically shown in FIG. 27 includes four-way solenoid vales 194 and 195, which are shown therein in their energized conditions. A conduit 208 is connected between a port 209 of solenoid valve 195 and also to conduit 113 of clamp actuating cylinder 101 and conduit 124 of clearance arm operating cylinder 119. Thus, when pressurized air is fed through supply conduit 210 it passes straight through solenoid valve 195 and its ports 209 to conduit 208 for supply to the bottom ends of cylinders 119 and 101 and onward through a pressure regulator 211 to a supply port 212 of energized four-way solenoid valve 194. The supplied pressurized air thus passes straight through the latter to a conduit 213 connected to port 214 for feed to conduits 215 and 216. Conduit 215 is connected to a pressure switch unit 217, with switch 218 thereof being biased to open condition to break an electrical circuit which may be connected to terminals 219 and 220 thereof. Feed of pressurized air through conduit 215 to pressure switch unit 217 will thus cause the switch 218 to close at a critical pressure, and when the pressure drops below this critical value the switch will again open the circuit. Supply of pressurized air through conduit 216 to the top end of rail driving cylinder 87 will cause its piston rod 89 to travel downwardly to cause intervening mechanism to move the guiding and clamping rails 80 and 180 inwardly toward each other. The bottom end of the cylinder 87 is connected by conduit 221 to a port 222 of solenoid valve 194 so that air will be vented through this conduit and port back straight through this valve to exhaust port 223 thereof. The conduit 112 of the cylinder 101 is connected to a port 224 of solenoid valve 195 which leads straight through an exhaust port 225. A pair of flow control valves 227 and 228 are respectively connected in the conduits 213 and 221.

Thus, when both solenoid valves 195 and 194 are energized, pressurized air is fed successively therethrough to the pressure switch 217 to close it and to the top end of pneumatic cylinder 87 to move the rails 80 and 180 transversely inward toward each other. At the same time pressurized air is fed to the bottom end of the cylinder 119 to extend its piston rod 122 and swing the clearance arm 116 out away from the inside face of flange 181 of rail 180, toward the opposed inside face of the flange 81 of rail 80. Also, at this time pressurized air is fed through conduit 113 to the bottom end of the pneumatic cylinder 101, so as to retract its piston rod 103 for freeing the clamping mechanism 104–108 and releasing the rail driving mechanism to permit the rails 80 and 180 to be driven transversely inward toward each other. If now solenoid valve 194 be de-energized while solenoid valve 195 remains energized, the pressurized air will be fed from conduit 208 through the cross path 229 in solenoid valve 194 to the conduit 221 for supply to the bottom end of pneumatic cylinder 87, so as to move its piston rod 89 upwardly for retracting or transversely moving apart the rails 80 and 180, with the top end of this cylinder being vented back through conduits 216 and 213 and cross path 230 to the exhaust port 223. Thus, with maintenance of the energization of the solenoid valve 195 alternate energization and de-energization of solenoid valve 194 will successively move the clamping rails 80 and 180 toward and away from each other.

Upon de-energization of solenoid valve 195 pressurized air is fed through its cross path 231 to port 224 for supply through conduit 112 to the back end of pneumatic cylinder 101, so as to thrust its piston rod 103 outwardly for again applying clamping force to the rail driving mechanism to hold the rails in adjusted relative positions, and the opposite end of this cylinder is vented back through conduit 113, a portion of conduit 208 to port 209 and along cross path 232 to exhaust port 225. The back end of pneumatic cylinder 119 is simultaneously vented back through conduit 124 and this venting path also to exhaust port 225.

Thus, when the rail driving mechanism is clamped by the clamping devices 104–108 pressurized air is not supplied to either end of the pneumatic cylinder 87, so that there is no tendency to drive the rail moving mechanism in either direction while the clamp is applied, and vice versa. The clearance arm 116 is extended by pneumatic cylinder 119 only when pneumatic cylinder 87 causes the rails 80 and 180 to move transversely inward toward or outward away from each other. The pressure switch 218 is closed only when pressurized air is being supplied to the pneumatic cylinder 87 to drive the clamping rails 80 and 180 inward toward each other. Accordingly, if this pneumatic cylinder 87 is capable of so moving these rails at a pressure lower than that necessary to close the pressure switch 218 it is possible to delay closure of the latter when the rails have been brought inward to clamping positions adjacent opposite sides of a carton with continued supply of pressurized air through conduit 216 and following a time interval during which the pressure may be gradually built up in the pressure switch unit 217 to the critical switch closing pressure.

As will be seen from FIGS. 1, 4 and 30, the flap folding head structure 142 includes suitable carton side flap folding plows 233 and 333 which extend from initial top ends at 234 and 334 obliquely down in an advance direction while converging toward each other. Preferably the plows 233 and 333 are provided as sections of a length of rod stock having a transverse mid-section 433 supported by suitable anchoring means or a clamping device 236 mounted in the angle between the bottom side of the beam 143 and the depending post 144. As is presently known in the art, plows of such shape will gradually turn over and fold down upwardly-extending carton flaps when they are moved forward to engagement of their outside faces against the inner sides of such plows.

The operation of the present machine in automatically closing successively a series of loaded open top cartons is explained hereinafter. In the event that one such carton may be overly filled, so that as its front and back top flaps are folded down they are bulged up above the break lines of the side flaps, the folding of the latter may bend the side flaps above their scored break lines to produce an ineffective or unsightly closure of the carton top. The presser plate 150 of the flap folding head 142 is intended to dictate folding of the front and back top flaps to a common plane in which is substantially disposed the scored break lines of the side flaps, but the downward biasing thereby due to the stiffness of this presser plate may not be sufficient to attain this desired end with certain such overfilled cartons. This problem is readily solved by applying supplemental biasing to the presser plate 150, as is proposed in FIG. 30. Let it be assumed that such an overfilled carton 238 has the appearance of that depicted in FIG. 29 with its folded front and back flaps 239 and 240 bulged by the excessive quantity 241 of the product loaded thereinto. The plane of the scored break lines of the side flaps 242 is indicated by the dot-dash line 243 and it is seen from FIG. 29 that the end portions of the front and back folded flaps 239 and 240 are disposed in a plane appreciably above this break line plane. Thus, the folding down of the side flaps 242 may cause them to be bent along the plane of disposition of the opposed end portions of the bulging folded front and back flaps 239 and 240. This undesirable result can be avoided if sufficient pressure is applied to the top surfaces of the upwardly bulging folded front and back flaps 239 and 240 to compact the product load 241 within the carton chamber and depress these folded flaps down to the plane of the scored break lines 243 of the side flaps 242. As is proposed in FIG. 30 supplemental biasing force may be applied to the presser plate 150 in the form of a pneumatic cylinder 244 having its back end 245 suitably abutted and anchored to the underside of beam 143. Pneumatic cylinder 244 may be of the single action type with a supply conduit 444 feeding air to the chamber thereof behind its piston, so as to thrust downwardly piston rod 247. The piston rod 247 has its lower end pivotally connected at 248 to a bearing shoe 249 superposed on the presser plate 150, and suitably anchored thereto, such as by welding, if desired. Thus, when pressurized air is fed to the cylinder 244 through its supply conduit 444, such as by manipulation of a valve, manually or otherwise, in this flow line, the presser plate 150 will bias the folded front and back flaps 239 and 240 down to the full line positions shown in FIG. 30 with compression of the carton contents 241, to assure that these folded flaps are substantially disposed in a plane of the scored break lines 243 of the side flaps 242. Thereafter, folding down inward and toward each other the side flaps 242, for stacking them upon the folded front and back flaps 239 and 240, by the plows 233 and 333 will assure that these side flaps are swung inward about their scored break lines 243 to attain a proper and sightly closure of the top of the carton. It will be seen from FIG. 30 that the application of force by air pressure applied through cylinder 244 moved the presser plate 150 down from its dot-dash position indicated at 350 to its full line position shown in FIG. 30, through the distance 251 indicated therein, in effecting this compacting operation.

CONDITIONING OF CIRCUITRY FOR "RANDOM" OPERATION

Reference should be had to the wiring diagram of FIG. 28 for an understanding of the following operations. The power is turned on to energize "L1," "L2" and "L3," with the A.C. starter switches 252 in the supply circuit of the main motor 51 and the A.C. reversing starter switches 253 and 254 of the vertical motion motor 174 open. Starter switches 252 are closed by energization of relay coil 2520. The "Up" starter switches 253, which dictate drive of motor 174 in one direction for lift of the head 2, are closed by energization of relay coil 2530, and the "Down" starter switches at 254, which dictate reverse drive of this motor for lowering the head, are closed by energization of relay coil 2540. A brake coil 255 is associated with motor 174 to hold it in stopped position. A rectifier circuit 256 for converting A.C. power to D.C. energy supplies the latter to magnetic brake 67–1 and magnetic clutch 67–2 through parallel circuits which are alternately closed. The circuit of the magnetic brake 67–1 includes a biased-closed switch 257 and the circuit of the magnetic clutch 67–2 includes a biased-open switch 258, and these switches are tied together for simultaneous alternate opening and closing by relay coil 2560. Since relay coil 2560 is initially de-energized, the brake circuit switch 257 remains closed with the brake applied to the drive of the chain conveyor 59–159.

A carton size switch 259 is then set to its "Random" position 260 to close it, and the open position thereof is a "Uniform" setting 261. This closure of the size switch 259 closes the circuit of a relay coil 2620. Energized relay coil 2620 closes a switch 262–1 to energize photo cell system 1380, which includes the photo cell 138 in the vicinity of the selector gate 12, and photo cell system 1400, which includes the photo cell 140 at the sensing and flap folding station (occupied by the carton at "Y" in FIG. 1). When the beam of light from the light source 139 in the vicinity of the selector gate 12 is interrupted by an entering carton (as it moves forward from the supply position "Z" in FIG. 1), the excitation of photo cell 138 is discontinued to effect closure of a circuit switch 138–1 (located in a circuit near the bottom of FIG. 28). When the beam of light from the light source 141 is interrupted by a carton at the sensing and flap folding station (position "Y" of FIG. 1), the excitation of photo cell 140 is discontinued to close a normally open switch 140–1 and open a normally closed switch 140–2.

Energization of relay coil 2620, upon closure of the size switch 259, manipulates a plurality of switches associated therewith, including the normally open switch 262–1, a normally closed switch 262–2, a normally open switch 262–3, a normally closed switch 262–4 and another normally open switch 252–5. Normally closed switch 262–2 is located in the energizing circuit of relay coil 2560 leading from a "Start" button switch 263 which also controls the energizing circuit of relay coil 2520 that includes an overload switch 264. The "Start" button switch 263 is shunted by a holding circuit which includes a magnetic overload switch 265 and normally open switch 252–4 controlled by relay coil 2520, so that when the latter is energized this holding circuit will continue to supply energy to the branch circuits leading from the "Start" push button switch 263. Normally open switch 262–3, which is closed by energization of relay coil 2620, is located in a circuit shunting switch 262–2 in the energizing circuit of relay coil 2560, and the latter cannot now be energized, because switch 262–2 is held open by the energization of relay coil 2620, except through one of two shunt circuits, i.e., either through switches 149–1 and 218 connected in series, or through switches 262–3 and 135–1 connected in series.

Switch 149–1 is one of a pair incorporated in the sensing switch unit 149 supported by the flap folding head 142 and is biased toward closure while being held open by the depending orientation of the front flap folding arm structure 146. The other switch 149–2 of this switch unit 149 is biased toward open position and is held closed by this depending orientation of the front flap folding arm structure 146. Switch 218 is the pressure switch of FIG. 27, which ultimately is closed by build up of the pressure of pressurized air in the pressure switch unit 217 to a critical value. Thus, when the flap folding head 142 is lowered down over an open top carton at the sensing and flap folding station "Y" in FIG. 1, with attendant upward swing of front flap folding arm structure 146 to the lateral position indicated in FIGS. 5 and 30, the trigger 148 of switch unit 149 is released to allow its switches 149–1 to close and 149–2 simultaneously to open, which is at the instant that the height of the carton at this station is sensed physically.

Switch 135–1 in the other shunt circuit for relay coil 2560 is one of a set of three switches of the limit switch unit 135 controlled by the tripping lugs 66–1 and 66–2 on the conveyor chain 59, and it is biased toward closed position and held open when one of these lugs trips the trigger 136 upward and holds it in this position until the lug passes therebeneath. The other two switches 135–2 and 135–3 of the limit switch unit 135 are biased toward open positions and are held closed while the trigger 136 of this limit switch is in engagement with one of the chain lugs 66–1 and 66–2. Thus, in the absence of cartons in the machine and while the brake 67–1 is applied to the drive of the chain conveyor 59–159 with one of the lugs 66–1 and 66–2 holding the limit switch unit 135 tripped, the switch 135–1 is held open and switches 135–2 and 135–3 are held closed until the clutch 67–2 effects drive of this conveyor section to release the trigger of this limit switch unit.

Since the energization of relay coil 2620 closed switch 262–5 at the same time that it opened switch 262–4, the solenoid valve 197 is energized through switch 135–3 (being held closed by the tripping of the limit switch unit 135) and a normally closed switch 266–1. As was explained in connection with FIG. 26, energization of the solenoid valve 197 caused pressurized fluid or air to be supplied to the top ends of the pneumatic cylinders 18 to retract or lower the selector gate 12, thereby permitting entrance of the leading edge of the bottom of a carton in the position "Z" of FIG. 1 for advance over the lowered gate. Switch 266–1 is one of a pair controlled by a relay coil 2660 which may be energized through photo cell system switch 138–1 when closed, to close switch 266–2 when switch 266–1 is simultaneously opened thereby. Thus, switch 266–2 is located in a holding circuit shunted around the photo cell system switch 138–1 to maintain energization of the relay coil 2660 after this photo cell system switch is opened by advance of an entering carton beyond the photo cell 138 in the vicinity of the selector gate 12, so as to maintain switch 266–1 open with solenoid valve 197 de-energized. Consequently, the selector gate 12 is lifted to beneath the bottom of the advancing carton and will be maintained in its lifted position to bar the entrance of the next oncoming carton while this carton is being permitted to slide forward over the gate roller 17 onto the initial conveyor section belt 27 for advance to the sensing and flap folding station opposite the photo cell 140. Not until the holding relay coil 2660 is de-energized by opening of the limit switch 135–3, upon drive of the chain conveyor 59–159 to transport the carton from the sensing and flap folding station forward, will the gate retracting solenoid 197 be permitted again to be energized to permit entrance of the next succeeding carton. This successive periodic energization of the gate retracting solenoid 197 will be effected only when switch 266–1 is permitted to close by the de-energization of relay coil 2660 and the closure again of switch 135–3 by tripping of the limit switch unit 135 when the next lug 66–2 carried by conveyor chain 59 is moved to contact of its trigger 136.

Upon closure of the "Start" button switch 263 the main motor is started by closure of its A.C. starter switches at 252 resulting from energization of relay 2520, and this motor is kept running by the simultaneous closure of the switch 252–4 in the shunt circuit about the "Start" button switch, as a result of the energization of this relay coil. An energizing circuit for the solenoid valve 194 is conditioned for operation of the latter initially through the "Start" button switch 263 and then its holding circuit including switch 252–4 which is closed with simultaneous closure of the switches in the A.C. starter 252, switch 262–3 closed by the energization of relay coil 2620, and switch 135–2 held closed at the limit switch 135 by the pause of the chain conveyor. The moment that an entering carton is supplied by the conveyor belt 27 to the sensing and flap folding station at "Y" (FIG. 1), to break the beam of light emanating from the light source at 141 directed to the photo cell 140, the photo cell sytem 1400 effects closure of switch 140–1 to energize solenoid valve 194 and manipulate it to the position of through flows of FIG. 27, thereby permitting supply of pressurized fluid or air to the pressure switch unit 217 and the back end of the pneumatic cylinder 87 for drive of the clamping rails 80 and 180 inward toward each other to abut opposite sides of the carton at the sensing or flap folding station.

The closed switch 135–2 also permits current to flow through conductor 267 to solenoid valve 195 to energize it and obtain the flow paths illustrated in FIG. 27 for supplying the pressurized air to the back end of the pneumatic cylinder 87 for driving the clamping rails 80 and 180 inward toward each other to carton clamping positions. Sumultaneously the pressurized air is supplied through energized valve 195 to the front end of the pneumatic cylinder 101 to release the rail driving mechanism clamp 104–108 and thus permit this rail driving action, while supplying the pressurized air to the pneumatic cylinder 119 to extend the clearance arm 116, so that the carton in the position "Y" will be clamped between the approaching rail flange 81 and this extended clearance arm securely to hold the carton at this station for flap folding operations.

Upon closure of the switch 140–1, manipulated by the photo cell system 1400 as a result of the presence of the clamped carton at the sensing and flap folding station, current is supplied through the closed head limit switch 149–2 and the closed downward travel limit switch 186–1 to relay coil 2540. The resulting energization of relay coil 2540 manipulates the switches of the "Down" A.C. starter 254 to closed positions effecting drive of the vertical motion motor 174 to lower the head down to the top of the carton pausing at the sensing and flap folding station. The lowering of the flap folding head 142 and attendant folding back and inward of the upwardly-extending front flap by the arm structure 146 is attended by upward swing of the latter to release the sensing limit switch unit 149, thus permitting closure of its switch 149–1 in the shunt circuit leading to relay coil 2560 and permitting simultaneous opening of the companion switch 149–2 thereof to de-energize relay coil 2540. As a result, the switches of the "Down" A.C. starter 254 are permitted to open and stop the motor 174 to discontinue downward drive of the flap folding head 142. Thus, the circuit to the relay coil 2560 is readied for closure so that the latter may be energized to release the brake 67–1 by opening switch 257 and engage the clutch 67–2 by closing the switch 258 for initiating drive of the chain conveyor 59–159.

There was connected in parallel from closed relay switch 135–2 a second circuit for effecting lift of the flap folding head 142, following this lowering action to the top of the carton and the attendant sensing of the height of the latter. This parallel circuit includes a conductor 268, in which the photo cell switch 140–2 is located, and closed upward travel limit switch 186–2 leading to relay coil 2530. The pause of the carton at the sensing of flap folding station caused interruption of the light beam emanating from the light source at 141 to discontinue impingement thereof on photo cell 140, so that the resulting de-excitation of the latter caused opening of the photo cell switch 140–2 as photo cell switch 140–1 was closed. Thus, the energizing circuit of relay coil 2530 is readied for energizing the latter. Upon withdrawal of the carton from the sensing or flap folding station by the driven chain conveyor 59–159, to permit impingement of the light beam from light source 141 again upon the photo cell 140 for exciting the latter, switches 140–1 and 140–2 are manipulated by the photo cell system 1400 to the positions indicated in FIG. 28 for effecting energization of relay coil 2530. The energization of relay coil 2530 causes it to close the switches of the "Up" A.C. starter 253 to effect reverse drive of the vertical motion motor 174, so that the latter will lift the flap folding head 142 until the vertical travel limit switch 186–2 is opened by engagement of the switch trigger 187 with the limit collar 193. The lift of the flap folding head 142 frees the front flap folding arm structure 146 from engagement of the carton top to permit it again to swing down to the depending position shown in full lines in FIG. 1, thereby tripping the limit switch unit 149, again to open the switch 149–1 and close the switch 149–2, so as to ready the circuitry for again lowering the flap folding head in the next cycle of operation on the succeeding carton.

As has been previously explained, when the clamping and guiding rails 80 and 180 are driven inwardly to engage flange 81 of the former and extended clearance arm 116 of the latter to opposite sides of the carton at the sensing and flap folding station the supply of pressurized air to the back end of pneumatic cylinder 87 is prevented from driving its piston 88 forward, but the pressurized air is continued to be supplied straight through energized solenoids 195 and 194 to the pressure switch unit 217 so as to build up the pressure in the latter to ultimate closure of the pressure switch 218. Upon closure of the pressure switch 218 relay coil 2560 is energized to open the magnetic brake circuit at switch 257 and close the magnetic clutch circuit at switch 258 to effect the drive of the chain conveyor 59–159. The resulting travel of the chain conveyor 59–159 drags the limit switch trip lug 66–1 from beneath trigger 136 of the limit switch 135, thus permitting its held open switch 135–1 to close with simultaneous opening of its switches 135–2 and 135–3. Since switch 262–3 is held closed by continued energization of relay coil 2620 a holding circuit, shunted around head limit switch 149–1 and pressure switch 218, is completed through closed switches 262–3 and 135–1 to maintain the energization of relay coil 2560 for continuing the closure of the magnetic clutch circuit switch 258 while the magnetic brake circuit is continued to be held open at switch 257. This condition is continued until the following trip lug 66–2 carried by conveyor chain 59 moves forward to drag beneath the trigger 136 of the limit switch 135 to effect opening of the holding circuit to relay coil 2560 at the limit switch 135–1, as will be understood from FIG. 28.

The drive of the chain conveyor 59–159 ultimately caused the next successive carton pick up flight 64 thereof to move in behind the carton "Y" pausing at the sensing and flap folding station and pick it up for forward transportation therefrom. The withdrawal of the carton from the sensing and flap folding station by the chain conveyor 59–159 and its next following flight 64 brought to abutment of the back edge of the carton is accompanied by the de-energization of both solenoid valves 194 and 195 effected by the opening of the limit switch 135–2. As was explained in connection with FIG. 27, a flow passage through de-energized solenoid valve 194 is thus readied for later supply of pressurized air to the opposite end of the pneumatic cylinder 87, so that the latter can reversely drive the rail operating mechanism at a future time to retract the latter from each other for free reception of next carton therebetween, and the pressure switch unit 217 is vented back therethrough again to open the pressure switch 218 for readying the energizing circuit of relay coil 2560 for the successive cycle. The simultaneous de-energization of solenoid valve 195 reverses the flow passages therethrough so that no pressurized air is being supplied to solenoid valve 194, and the pneumatic cylinder 119 and the front end of pneumatic cylinder 101 are vented back through de-energized solenoid 195. Pressurized air is thus supplied through the latter to the back end of clamp operating pneumatic cylinder 101 to apply the clamp 104–108 to the rail driving mechanism, thereby holding the rails 80 and 180 in their inward positions. The simultaneous venting of the pneumatic cylinder 119 withdraws forward thrust from the clearance arm 116 so that now the carton may be freely transported forward between the rails 80 and 180 in the inward positions of the latter, so that these rails will co-operatively provide means to guide the carton in its forward travel toward the discharge end of the machine.

As soon as the next oncoming tripping lug 66–2 of the driven chain conveyor 59–159 closes the switch 135–2 of the limit switch unit 135 the circuit of solenoid valve 195 again becomes energized to repeat the supply of pressurized air to the pneumatic cylinder 119 for extension of the clearance arm 116 thereby and to supply the pressurized air to the head end of pneumatic cylinder 101 to release the rail driving mechanism clamp 104–108. However, de-energized solenoid valve 194 now dictates supply of the pressurized air (flowing through energized solenoid valve 195) across therethrough to the front end of pneumatic cylinder 87, so as to retract the guiding rails 80 and 180 transversely away from each other to their initial carton-receptive positions depicted in FIG. 2. Only when the next oncoming carton is supplied to the sensing and flap folding station to effect closure of the photo cell switch 140–1 will solenoid valve 194 be again energized to drive the clamping rails 80 and 180 inward toward each other to abutment of opposite sides of this next carton. Then the energizing circuit of relay coil 2540 will again be closed at this photo cell switch 140–1 for the next cyclic lowering of the flap folding head 142.

For this repeat operation the selector gate 12 must be retracted or lowered to permit entrance of the next oncoming carton, at "Z," so that it may be fed by the conveyor belt 27 to the sensing and flap folding station at "Y." As was explained in connection with FIG. 26, solenoid valve 197 must be energized for this purpose. Its energizing circuit includes a conductor 269 in which is connected in series switches 262–5, 135–3 and 266–1. Normally open switch 262–5 was closed by the initial energization of relay coil 2620, resulting from closure of the size switch 259 when the latter was manipulated to its "Random" setting 260. Switch 135–3, which is biased toward open position, was closed by the tripping of trigger 136 of limit switch 135 when engaged by the next tripping lug 66–2 on the conveyor chain 59. Switch 266–1 is one of a pair of switches (the other being 266–2) controlled by a relay coil 2660. Switch 266–1 is biased closed while its companion switch 266–2 is biased open, and upon energization of relay coil 2660 the first will be opened and the second closed. Thus, before relay coil 2660 is energized the solenoid valve 197 will be energized and its energization continued, so as to hold the selector gate 12 down or retracted until its energizing circuit is broken at switch 266–1 by the energization of relay coil 2660, during such time as switch 135–3 is held closed by the trip of limit switch 135 when its trigger 136 is engaged by the conveyor chain lug 66–2. This closure of limit switch 135–3 is maintained while the chain conveyor 59–159 is not being driven and during the initial increment of each following periodic drive thereof as either of the tripping lugs 66–1 and 66–2, carried thereby, is being dragged beneath trigger roller 137 of limit switch unit 135. The length of each of the tripping lugs 66–1 and 66–2 bears a relation to the minimum size of cartons to be effectively closed in any particular embodiment of the machine.

With switches 262–5 and 135–3 closed, the closure of switch 138–1 (by de-excitation of the photo cell 138 with the breaking of the light beam from light source 139 by advance of a carton across the retracted gate 12) effects energization of relay coil 2660. The energization of relay coil 2660 closes its switch 266–2 and opens its switch 266–1, thereby de-energizing the gate retracting solenoid 197, so that the pneumatic cylinders 18 lift the gate as this carton is gliding forward over the gate roller 17 to the conveyor belt 27. As this fed carton passes beyond photo cell 138 the photo cell switch 138–1 is again opened, but the energization of relay coil 2660 is maintained by a holding circuit shunted around this photo cell switch which includes closed relay switch 266–2. Thus, the energization of relay coil 2660, to continue the de-energization of solenoid valve 197, is maintained until the energizing circuit of this relay coil is broken by the opening of switch 135–3 as one of the tripping lugs 66–1 and 66–2 is dragged from beneath the trigger 136 of limit switch unit 135. Accordingly, the selector gate 12 remains raised to its carton-barring position so long as the relay coil 2660 remains energized.

As was previously explained in connection with FIG. 25, the back flap kicker 161 is swung down to strike the top edge of the upwardly-extending rear top flap and fold it forward down to the horizontal plane of the open top of the carton when the solenoid valve 198 is energized. The energizing circuit of solenoid valve 198 includes in series physical sensing switch 128, which is normally biased to closed position, and normally open switch 256–1, which is closed only when relay coil 256O is energized. Since a carton must be present at the sensing and flap folding station "Y" in order for the lowering of the head 142 to close the switch 149–1 as the front flap folding arm structure 146 effects its folding operation with upward swing to its lateral position, and this carton must be clamped thereat between the clamping rails 80 and 180 in their inward positions to cause a sufficient build up of pressure of the pressurized air fed to pressure switch unit 217 to effect closure of the pressure switch 218 in order initially to energize relay coil 256O, the closure of switch 256–1 is attained only after these conditions are satisfied. The closure of switch 256–1 is then maintained by the shunt circuit which includes limit switch 135–1, the latter being closed only as the chain conveyor 59–159 is driven to drag one of its tripping lugs 66–1 and 66–2 from beneath the trigger 136 of limit switch unit 135. Now, if during any such time of maintenance of closure of the relay switch 256–1 physical sensing switch 128 is permitted to attain its normally closed position, the solenoid valve 198 will be energized to swing the kicker 161 down for folding the back flap. Since the presence of a carton at the sensing and flap folding station and its clamping between the rails 80 and 180 causes retraction of the operating arm 129 of sensing limit switch 128, this carton must be moved forward beyond the latter by travel of the chain conveyor 59–159 and the pick up of the carton by the following flight 64 thereof to release the sensing switch operating arm 129 to effect the energization of solenoid valve 198 and operate the kicker 161. Consequently, the back flap of the carton open top will be folded down to closed position only while the carton is being transported forward from the sensing and flap folding station "Y" beyond the physical sensing means comprising switch 128 and its operating arm 129. This back flap kicker 161 then remains down, with its bottom face 173–2 substantially in the plane of the bottom face 146–1 of the upwardly swung lateral front flap folding arm structure 146, until the limit switch unit 135 is again tripped by the next following lug 66–2 carried by conveyor chain 59 for opening the holding circuit of relay coil 256O at the switch 135–1. The resultant de-energization by the opening of the switch 256–1 causes the solenoid valve 198 to be de-energized, so as to reverse the flow passages therethrough and supply the pressurized air to the back end of pneumatic cylinder 163 to cause the kicker 161 to be swung back up to its cocked position shown in full lines in FIG. 1.

RANDOM OPERATION

An embodiment of the machine of the present invention, when of the construction illustrated in the drawings and equipped with electrical and pneumatic systems diagrammatically depicted in FIGS. 25 to 28 incl., will operate as follows when a series of cartons of random size are fed to the entrance end thereof by the supply conveyor 9. The size switch 259 is set to its "Random" position 260 and the "Start" push button 263 is pushed to drive the main motor 51. There are no cartons in the machine and while the belt conveyor 27 is being driven continuously the chain conveyor 59–159 is held stopped by the magnetic brake 67–1 with the limit switch 135 tripped. As a result, the gate operating solenoid valve 197 is energized and holds the selector gate 12 retracted for entrance of the first carton at the position "Z" in FIG. 1. At this time, the vertical motion motor 174 is undriven and the flap folding head 142 is in its top position, and the back flap kicker 161 is in its cocked position. The guide rails 80 and 180 are in their carton-receptive retracted positions.

As the leading edge of the bottom of the carton at "Z" enters over the retracted selector gate 12, the beam of light from the light source 139 which impinges upon the photo cell 138 is interrupted. Consequently, the selector gate 12 is raised to lift its roller 17 beneath the bottom of the entering carton which permits the latter to glide forward onto the driven conveyor belt 27 while positioning the carton-barring gate flange 16 into the path of the next oncoming carton supplied by feed conveyor 9. The driven conveyor belt 27 transports this first carton forward to between the retracted guide rails 80 and 180 and on to the sensing and flap folding station at the position "Y" until the front end of the carton is brought to abutment of the stop flight bar 164 carried by the pausing chain conveyor 59–159. As the carton was fed to this sensing and flap folding station it interrupted the beam of light emanating from the light source 141 to block off impingement thereof on the second photo cell 140. As a result of this interruption of the light beam which impinged upon the photo cell 140, the guide rails 80 and 180 are caused to be driven inward toward each other to abut the flange 81 of the former and the extended clearance arm 116 of the latter to opposite sides of the carton and clamp it at this station. Thus the near side of the carton is forced against the near side rail flange 81 and the far side of the carton is in firm contact with the extended clearance arm 116 while being held by the latter a fraction of an inch out of contact with the flange 181 of the rail 180. Pressure is then built up in pressure switch 217 to close the pressure switch 218 for conditioning the release of the chain conveyor 59–159 by the magnetic brake 67–1 and drive thereof by the magnetic clutch 67–2.

The interruption by the carton of the beam of light impinging on photo cell 140 at the sensing and flap folding station "Y" also initiates the drive of the vertical motion motor 174 to lower the flap folding head 142 down over the open top of the carton pausing at this station. As the flap folding head 142 is lowered its depending front flap folding arm structure 146 engages the upwardly-extending front flap and folds it back down to the horizontal plane of the top of the carton body with attendant upward swing of this flap folding arm structure. Attendant release of the limit switch 149 on the flap folding head 142 stops the downward motion of the latter, so that switch 149–1 is released to permit the energizing circuit of the chain conveyor actuating means to be closed when pressure build-up closes the pressure switch 218.

With the front flap of the carton top folded down to closed position, the closure of the pressure switch 218 will cause the magnetic brake 67–1 to be de-energized for release of the chain conveyor 59–159 and the magnetic clutch 67–2 to be engaged, so as to initiate drive of the chain conveyor for ultimate transport of the partially closed carton forward from the sensing and flap folding station at "Y." This forward drive of the chain conveyor 59–159, before the partially closed carton is picked up by the next oncoming flight bar 64 thereof, releases the limit switch 135. As a result, the sensing portion of the machine is de-energized by the attendant opening of the master control switch 135–2 while the clamp 104–108 is applied to the mechanism which drives the rails 80 and 180 transversely so as to hold them in their inward positions. Release of the limit switch 135 also relieves the biasing of the clearance arm 116 so that the carton is no longer clamped at the sensing and flap folding station but released for forward transport therefrom by the traveling chain conveyor between the rails 80 and 180 now serving as guides for the carton. The drive of the chain conveyor withdraws the stop flight bar 164 from in front of the partially closed carton, and continues eventually to carry its next following flight bar 64 forward to the back end of the partially folded carton, to pick up the latter and transport it forward.

While the carton was pausing at the sensing and flap folding station "Y" it held the sensing arm 129 depressed, so that the rear flap kicker 161 was maintained in its extended cocked position. As soon as the partially closed carton is picked up by the oncoming flight bar 64 of the chain conveyor 59–159 at the sensing and flap folding station and carried forward beyond the retracted physical sensing arm 129, the latter is released so that the cocked kicker 161 will be swung down, sharply to strike the rear side of the upwardly-extending back flap and fold it forward down to the plane of the folded front flap as the carton is being transported forward. These folded front and back flaps are then maintained in their folded positions as the carton travels forward further both by the lateral bottom surfaces 146–1 and 173–2 of the front folding flap arm structure 146 and the kicker 161, as well as by the presser plate 150. During this forward travel of the partially closed carton, the plows 233 and 333, carried by the flap folding head 142, engage the outer sides of the upwardly-extending side flaps and gradually turn the latter over and downward toward each other for stacking upon the folded front and back flaps, thereby completing the closure of the carton top.

Thereafter, the lapped and folded top flaps may be secured in any desired way, such as by applying tape thereto from the top taping unit comprising head beam "A," and the tape applying devices "B" and "C" and the tape supply reel "D" carried thereby.

The driven chain conveyor 59–159 then carries the closed carton forward to the discharge end of the bed unit 1 of the machine for delivery, and the chain conveyor is then ultimately stopped by engagement of its next oncoming tripping lug 66–2 with the trigger 136 of the limit switch 135. The tripped limit switch 135 causes the relay coil 2560 to be de-energized so as to release the magnetic clutch 67–2 and apply the magnetic brake 67–1 to hold the chain conveyor 59–159 in the stopped position illustrated in FIG. 1. The tripped limit switch 135 also activates the sensing units, recocks the kicker 161, causes the vertical motion motor 174 by reverse operation to raise the flap folding head 142 to its initial position, releases the rail driving mechanism clamp 104–108 and retracts the guide rails 80 and 180 to their initial carton-receptive positions, biases the clearance arm 116 outward from rail flange 181 and lowers the selector gate 12 to permit the entrance of the next oncoming carton stopped at the position "Z." If there is no succeeding carton at the position "Z," ready for entrance into the machine, the latter will remain readied to accept any supplied carton at any time thereafter for a repetition of the cycle of operation.

It will thus be seen that the limit switch 149 on the flap folding head which, with its operator in the form of front flap folding arm structure 146, constitutes pyhsical sensing means to sense the height of a carton at the sensing and flap folding station, controls the drive of the chain conveyor 59–159 and the lowering action of the flap folding head 142. This sensing means responds to the vertical dimension of the carton body. It also acts through the chain conevyor drive controlling relay 2560 and its switch 256–1 to cooperate with carton width sensing switch 128 for controlling the actuation of the rear flap folding arm or kicker 161, so that the latter is swung down to effect its folding operation only when the chain conveyor 59–159 is driven and the partially closed carton is being withdrawn by the latter from the sensing and flap folding station sufficiently to free the actuating arm 129 of sensing switch 128 to permit the latter switch to close. The second sensing means comprising switch 128 and its actuating arm 129, and rail 180 carrying them in cooperation with the opposed rail 80, is also of the physical type to respond to the transverse dimension or width of the carton body. The limit switch 135 which is operated by the conveyor chain 59 by means of trip lugs 66–1 and 66–2 carried thereon constitutes other control means which, in cooperation with optical sensing means at the sensing and flap folding station in the form of photo cell system 1400, dictates continuation of initiated drive of the chain conveyor 59–159, the transverse inward drive and retraction of carton clamping and guide rails 80 and 180 and the holding thereof to their inward carton-clamping positions, the elevational travel of the flap holding head 142, the extension of clearance arm 116 and the freeing of the latter, and the alternate retraction and lift of the selector gate 12. However, the effectiveness of the dictation of the entire manipulation of the selector gate 12 is dependent upon response of the other optical sensing means in the vicinity of the latter, in the form of photo cell system 1380, to the presence of a portion of a carton being fed across the gate to the conveyor means. Thus, there are a pair of physical carton sensing means comprising limit switches 149 and 128 and their associated carton-contacting operators, a pair of optical carton sensing means comprising photo cell systems 1400 and 1380, and a conveyor manipulated master control comprising limit switch 135 and its operating means.

In the event that, during such carton-closing operation of the machine, one of the cartons in the machine is found by the attendant to be damaged or initial partial closure thereof to be improper it may be quickly and readily freed from the machine without stopping the latter by manipulating a release switch unit 271. Release switch unit 271 comprises a bank of switches 272, 273, 274 and 275 which are simultaneously manipulated. The resulting opening of normally closed switch 272 in conductor 268 and simultaneous closing of switch 273 in a conductor 276, constituting a shunt energizing circuit leading to the relay coil 2530 which causes lift of the flap folding head 142, immediately raises the latter to its initial elevated position above such a carton if it is pausing at the sensing and flap folding station with the chain conveyor stopped. The accompanying opening of the switch 274 with simultaneous closing of switch 275 in a conductor 277, constituting a shunt energizing circuit leading to the solenoid valve 195, releases the carton clamping clearance arm 116 as the clamp 104–108 is applied to the rail driving mechanism. The application of clamp 104–108 prevents the rails 80 and 180 being driven in further toward each other for grip of the carton between the rail flanges 81 and 181.

CONDITIONING OF CIRCUITRY FOR "UNIFORM" OPERATION

The machine is set up for "Random" operation, as previously described, and the first of a group of cartons of uniform size to be closed successively by the machine is fed thereto in the same manner. Thus, when this first carton is delivered to the sensing and flap folding station, at "Y," its presence causes the photo cell system 1400 to close switch 140–1 and open switch 140–2. Consequently, the flap folding head 142 is brought down to the top of the carton to fold the front flap back and inward, and to condition the energizing circuit of relay coil 2560, so that the latter may open the brake circuit at switch 257 and close the clutch circuit at switch 258. The solenoid valve 195 was energized by the tripped limit switch 135 and the closure of switch 140–1 now energizes solenoid valve 194, so that pressure fluid is supplied successively through these solenoid valves to cause pneumatic cylinder 87 to move the clamping rails 80 and 180 inwardly to clamping positions on opposite sides of the carton. With eventual closure of pressure switch 218 relay coil 2560 is energized to open the brake circuit at switch 257 and close the clutch circuit at switch 258, thereby causing the chain conveyor 59–159 to be driven. The drive of the chain conveyor 59–159 removes the tripping lug 66–1, carried thereby, from beneath the trigger 136 of this limit switch, so as to open at switch 135–2 the circuits to the solenoid valves 194 and 195, causing the latter to effect clamping of the rails 80 and 180 to their inward positions. As was previously explained, this also released the clearance arm 116 by venting the pneumatic cylinder 119, so that successive cartons of the same size may freely pass between the inwardly positioned and clamped rails.

The machine also was manually conditioned initially for successive closing operations on the series of uniform size cartons thereafter fed through it. For this purpose the latch plate 154 was slid back on the front flap folding lever arm structure 146, so that as the latter is swung up in the folding down of the front flap of the first carton during the lowering of head 142 the spring-biased detent 153 is snapped up over the retracted latch plate to lock this arm structure up to its lateral position, for drag therebeneath of the upwardly-extending front flaps of all succeeding cartons of uniform size to fold them down to closing positions. At any time before the next following tripping lug 66–2 on the conveyor chain 59 arrives again to trip the limit switch 135 the machine may be finally conditioned for the uniform operation by positioning the size switch to the "Uniform" setting which opens the energizing circuit of relay coil 2620.

With the de-energization of relay coil 2620, the circuit connections controlled thereby are reversed. Thus the photo cell systems 1380 and 1400 are de-energized by opening the switch 262–1. Switch 262–2 is thus permitted again to close so as to maintain energization of relay coil 2560 to open switch 257 for brake release and close switch 258 for continuous drive of the chain conveyor 59–159. Also, switch 262–3 is permitted open. The biased open condition of switch 262–3 prevents electrical energy from being supplied to the branch circuits leading to the equipment for effecting raising and lowering of the flap folding head 142 and solenoid valves 194 and 195, even when limit switch 135–2 momentarily is closed by the engagement of the trigger 136 of the limit switch 135 with each of the conveyor chain-carried lugs 66–1 and 66–2 as it passes. Thus, de-energized solenoid valve 194 remains conditioned for supplying pressure fluid at some future time, after this "Uniform" operation is discontinued, to the bottom end of the pneumatic cylinder 87 (FIG. 27) for retracting the clamping rails 80 and 180. The continued de-energization of solenoid valve 195 maintains the application of clamp 104–108 to the mechanism which drives the clamping rails 80 and 180 in and out, to retain these rails in their inward carton guiding positions.

Since the switch 128 is biased closed and temporarily held open by depression of the arm 129 of this physical sensing switch upon passage of a carton through the sensing station at "Y," again to be biased closed after the carton has passed through the latter, the solenoid valve 198 will be energized through closed switch 256–1 upon biased closure of switch 128 and de-energized upon opening of the latter as a passing carton depresses its operating arm 129. The back flap folding kicker 161 is swung down from its cocked position by the energization of solenoid valve 198 and it is swung back up to its cocked position when this solenoid valve is de-energized. Thus, as each carton of uniform size is fed to the flap folding station "Y" (with the sensing equipment of the latter de-activated), the opening of switch 128 by its operating arm 129 as the latter is depressed by the passing carton with de-energization of solenoid valve 198 causes the back flap folding kicker 161 to be swung back up to cocked position, and soon thereafter, when switch 128 is released to closed position, the consequential energization of solenoid valve 198 causes the cocked kicker 161 to be swung down to fold the extending back flap forward and inward to closed position as the carton is moved forward. The kicker 161 remains in its down position until switch 128 is again tripped open by the approach of the next carton to the flap folding station "Y."

The selector gate operating solenoid valve 197 when energized pulls down or retracts the entrance gate 12 to permit a carton to advance to the continuously driven conveyor belt 27, and when it is de-energized it lifts the gate temporarily to bar entrance of the succeeding carton. Solenoid valve 197 is provided with a shunt energizing circuit which includes conductor 278 having therein switch 262–4 that is biased closed when relay coil 2620 is de-energized on the "Uniform" setting 261 of the size switch 259, and a switch 235 in series therewith. As was previously pointed out, switch 235 is similar to limit switch 135 and is operated or tripped by a series of trip lugs (which may be similar to 66–1 and 66–2) carried by the far chain 159 of the chain conveyor, each associated with one of the flights 64 of the latter. Thus, as each flight 64 passes switch 235 it will be closed momentarily to energize solenoid valve 197 and cause the latter to lower entrance gate 12 for permitting entrance of the next succeeding carton to the conveyor belt 27 and pick-up by the next arriving flight 64 of the chain conveyor 59–159.

UNIFORM CARTON SIZE OPERATION

As a result, operation of the machine on "Uniform" setting is as follows. By passing the first of a number of cartons of uniform size through the machine on "Random" setting 260 of size switch 259 the clamping rails 80 and 180 are caused to be moved inwardly to sense the carton at the sensing and flap folding station "Y" and the flap folding head 142 is moved down to sense the top of the carton thereat. Then, when the size switch 259 is shifted to the "Uniform" setting 261 to open the circuit of relay coil 2620, the machine is conditioned for continuous operation of the chain conveyor 59–159 with the clamping rails 80 and 180 secured to their inward, carton-guiding positions, and the flap folding head 142 is held down to the adjusted position at the plane of the top of the bodies of the cartons, with the front flap folding arm structure 146 latched to its horizontal position. The entrance gate 12 is pulled down by the energization of its operating solenoid valve 197. As a result, the next following carton of uniform size is permitted to travel over the retracted entrance gate 12 to the continuously driven conveyor belt 27.

This second carton of uniform size is transported forward by the belt conveyor 27 to the flap folding station "Y" and, during this travel, its extending front flap moves against the oblique shoe provided by presser plate nose 250 to be folded back and inward by drag beneath it and the latched horizontal front folding flap arm structure 146 and the presser plate 150. Since the chain conveyor 59–159 is also continuously driven its next flight 64 follows immediately behind this second carton as it is fed forward to the flap folding station "Y" to pick it up and carry it forward on through the machine. As this second carton approaches the flap folding station "Y," the far side thereof drags against the trip arm 129 of the sensing switch 128 to open this switch and de-energize the solenoid valve 198, thereby cocking the kicker 161 up to horizontal position. As soon as the continued forward transportation of this second carton frees the latter from the switch trigger 129 switch 128 is again permitted to close to re-energize solenoid valve 198 and swing the kicker 161 down to fold the extending back flap of the moving carton forward and inward to the horizontal plane of the folded front flap, so that both will be dragged successively in folded conditions beneath the latched arm structure 146 and the presser plate 150 of the lowered head 142. During this latter action, the side flaps will be folded inward by the plow rods 233 and 333 to lap over the folded front and back flaps. This closed second carton is than carried further forward to beneath the taping unit on the far end of the head 2 (or to any equivalent flap-securing means) securely to anchor the folded flaps in their folded positions, the continuously operating chain conveyor 59–159 then transporting the closed carton to the discharge end of the machine.

Since the chain 159 on the far side of the chain conveyor is equipped with a series of switch tripping lugs, each associated with one of the flights 64 of this conveyor, and the biased open switch 235 is tripped closed during the passage of each such lug, the solenoid valve 197 will be momentarily energized through closed relay switch 262–4 to lower the entrance gate 12 and permit the next succeeding carton of uniform size to move thereover onto the conveyor belt 27 for repetition of the action. The length of each of these switch tripping lugs on the far chain 159 is of a length sufficient to hold the entrance gate 12 down for a short period of time that is long enough to permit the leading bottom edge of the next succeeding carton to advance over the entrance gate before it is again lifted by de-energization of the gate operator solenoid valve 197.

The lift of the entrance gate 12 does not have to be delayed until the next succeeding carton has traveled completely over and beyond the gate in its depressed or retracted position, but merely long enough to permit the leading bottom edge to enter over it since, thereafter, even though the gate be raised again beneath the bottom of this carton while it is traveling forward to the conveyor belt 27, it will continue its forward travel to the latter over the gate roller 17 and by virtue of the nature of the initial feed, which may include forward push by following cartons. Thus, the entrance gate 12 drops down every time a flight bar 64 of the conveyor chain 59–159 passes to accept the next succeeding carton of uniform size.

On the "Uniform" setting of the machine cartons of uniform size can be closed thereby at a production rate of many times that of the "Random" setting, and in the machine illustrated in the drawings, this increased production rate will be four times that of the production rate for the "Random" setting and operation.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described our invention, what we claim as new and desire to secure by Letters Patent is:

1. In an automatic carton closing machine for folding down and inward the upwardly-extending front and rear flaps of a series of successive open-top cartons of random size to closed lateral lapping positions for securing the folded flaps of each together in carton closing positions the combination with lateral conveyor means having an entrance end and a discharge end and defining a path of forward carton travel along which said conveyor means transports each carton, a flap folding and sensing station located at a point along said path, means to cause each open-top carton to pause at said station, a movable front and rear flaps closing head mounted for motion along a path at an angle to said carton travel path toward and away from the open top of a carton pausing at said station, carton sensing means at said station responsive to the presence of an open-top carton pausing at said station to dictate advance of said head toward the unfolded and upwardly-extending flaps thereof and to fold back and inward to closing position the front flaps, carton height control means at said station responsive to the top of said carton to stop the head advance upon inward folding of the front flap down upon the carton top, means to release said pausing carton from said station for transport by said conveyor means toward the discharge end, and movable rear flap folding means carried in readied and non-operating condition by said head for location at a relatively fixed position along the carton travel path when said head approaches the open carton top to infold the front flap, said rear flap folding means in this relatively fixed position being adapted when activated to fold forward and inward said unfolded and upwardly-extending rear flap of the carton top when said unfolded rear flap is in the immediate vicinity of the relatively fixed position, of means to sense the location of said unfolded and upwardly-extending rear flap in this vicinity as the carton is carried forward therepast by said conveyor means and activate said rear flap folding means for folding said rear flap forward and down in properly timed relation as this flap is passing this flap folding means.

2. The automatic carton closing machine as defined in claim 1 characterized by said rear flap location sensing means comprising control means movable transversely inward to abutment of an opposed side of the carton pausing at said station which has its rear edge located in predetermined relation to the unfolded upstanding rear flap along the path of carton travel, said control means dictating activation of said rear flap folding means as the rear edge of said abutted carton side is withdrawn from abutting relation to said control means in renewed forward transportation of the carton from said station by said conveyor means.

3. The automatic carton closing machine as defined in claim 2 characterized by carton width sensing means at said station having opposed and transversely-spaced guide means between which the carton pauses at said station, one of said guide means carrying said control means and being movable transversely inward to abut said control means to the opposed carton side.

4. The automatic carton closing machine as defined in claim 3 characterized by said opposed and transversely-spaced guide means constituting clamping means at said sensing station to clamp each carton temporarily thereat during the advance of said head toward the top thereof and the inward folding of said front flap, said conveyor means releasing said clamping means thereafter.

5. The automatic carton closing machine as defined in claim 1 characterized by said conveyor means including a pair of successive sections with a continuously driven initial section at the entrance end to feed supplied cartons successively to said sensing station, and a periodically driven succeeding section successively to pick up the cartons at said sensing station and carry them forward therefrom, said succeeding conveyor section activating said means causing each carton to pause at said sensing station when said succeeding section is undriven.

6. The automatic carton closing machine as defined in claim 5 characterized by closed entrance gate means located ahead of said continuously driven initial section of said conveyor means which temporarily bars entrance thereto of an open carton, means to prevent opening of said gate means while a preceding carton is at said sensing station for performance thereon of the front flap folding operation, and means activated by the start of said periodically driven succeeding conveyor section to open said gate for entrance to said initial conveyor section of the succeeding carton, said gate opening means manipulating said gate to its carton entrance barring position before the following carton arrives thereat.

7. The automatic carton closing machine as defined in claim 5 characterized by means rendering said carton presence sensing means effective to advance said head to the open top of the carton at said sensing station, activatable means manipulated by said carton presence sensing means to retract said head to its initial position, and means to activate said head retracting means operable by renewed drive of the succeeding conveyor section after the latter removes the carton from said sensing station.

8. The automatic carton closing machine as defined in claim 4 characterized by said clamping means being in the form of a pair of opposed longitudinally-extending and laterally movable guide rails extending through said sensing station and forward past said flap folding means for centered guidance of each carton therebetween, at least one of said rails carrying on its inner face at said sensing station in inwardly extendable and outwardly retractable carton side engaging clearance member, means to extend said clearance member inward and move at least one of said rails inward toward the other to clamp said carton at said sensing station between said extended clearance member and the opposed guide rail, and means to permit retraction of said extended clearance member to free said carton for forward transport by said conveyor means between the inwardly positioned rails as guides while the latter are maintained in their opposed relatively inward positions, and means operated by drive of said conveyor means to manipulate said retraction permitting means.

9. The automatic carton closing machine as defined in claim 8 characterized by said means which moves said rails inward to carton clamping positions alternately being adapted to retract said rails outward to initial carton receptive positions, and means activated by said conveyor means to operate said rail retracting means before arrival of a succeeding carton at said sensing station.

10. The automatic carton closing machine as defined in claim 1 characterized by said head being mounted above said conveyor means for travel down to the top of an open carton at said sensing station and then lift back up to an initial higher position, means alternately to lower and lift said head, and opposed fixed plows converging toward the central portion of the path of carton travel in the forward direction of the latter carried by said head to engage outer sides of the upwardly extending side flaps as the carton is transported further forward by said conveyor means with its front and rear flaps folded down to turn said side flaps in and down over the folded front and rear flaps.

11. The automatic carton closing machine as defined in claim 1 characterized by the provision of head elevating mechanism alternately to lower said head to the open top of a carton at said sensing station and lift it up therefrom, said conveyor means having an alternately driven and undriven forward section extending from said sensing station, conveyor driving mechanism alternately to drive and stop said conveyor section, and limit means manipulated by said conveyor section to permit when the latter is undriven, said head elevating mechanism to operate when the presence of a carton pausing at said sensing station is sensed, said carton top sensing means controlling operation of said conveyor driving mechanism to start and drive said conveyor section after a period of stop thereof.

12. The automatic carton closing machine as defined in claim 11 characterized by said limit means including means to deactivate said head elevating mechanism during drive of said conveyor forward section.

13. The automatic carton closing machine as defined in claim 12 characterized by said limit means including means to deactivate said conveyor forward section driving mechanism after a period of drive of said conveyor section.

14. The automatic carton closing machine as defined in claim 13 characterized by entrance gate means located at the entrance end of said conveyor means which bars entrance of a succeeding open carton while a preceding carton is pausing at said flap folding and sensing station, and means to open said gate to permit entrance of the succeeding carton and then to close it before arrival of the next following open carton, said limit means including means to manipulate said gate opening and closing means for opening and holding open said gate when said conveyor forward section is undriven and in the absence of carton structure between said gate and sensing station, and for urging said gate toward closed position upon entrance of at least a portion of a carton beyond the latter.

15. The automatic carton closing machine as defined in claim 14 characterized by said gate manipulating means including gate operation carton sensing means located between said gate and sensing station to deactivate said gate opening means in response to passage of carton structure past this carton sensing means to permit said gate to be urged toward closed position.

16. The automatic carton closing machine as defined in claim 8 characterized by means to manipulate said rear flap folding means, and a device alternately to activate and deactivate said last-mentioned manipulative means, said device being movably mounted on one of said clamping and guiding rails at said sensing station for adjustable motion longitudinally of said rail and including said control means to abut a side of a carton when the latter is clamped between said rails at said sensing station for deactivating said manipulative means, said carton side abutting control means being disengaged from the carton side when said carton is transported forward from said sensing station to activate said manipulative means for flap folding operation of said folding means, said device being tethered by a swinging tie to fixed structure whereby when a narrower carton is clamped between said rails said device is adjusted to a further advanced position along the carton path than when a wider carton is clamped therebetween to effect the flap folding operation for shorter rear flaps at a point of further advance of the carton.

17. In an automatic carton closing machine the combination with a pivoted flap folding arm retracted upwardly at a flap folding station along a path of forward transportation of an open top carton to swing forwardly down and strike the back side of an upwardly extending rear top flap of the carton for folding said flap forward down to a lateral closing position, movable carton guide means arranged along said path, and mechanism to move said guide means transversely inward to adjacency of a side of the carton at said station, of flap folding control means movably supported on said guide means for adjustable travel along the path comprising means to dictate alternate upward retraction of said pivoted flap folding arm and downward flap folding swing, means for actuating said dictating means extending from the inward side of the latter to be brought to contact of the opposed side of the carton at said station by transverse inward motion of said guide means to effect an actuation of said dictating means with a second actuation of the latter being effected upon being freed from contact with the opposed side of the carton, one of the two actuations of said dictating means initiating flap striking downward swing of said folding arm, and substantially rigid elongated tie means pivotally anchored at one end to relatively fixed structure and at the other end to said dictating means to cause the latter to be moved forward on said guide means with transverse inward motion of the latter to adjacency of the carton side whereby said dictating means is advanced forward along the path a distance proportionate to the width of the carton.

18. The apparatus defined in claim 17 wherein mechanism is provided to transport the carton forward from said station along the path to free its side from said actuating means contacting it and effect the second actuation of said dictating means.

19. The apparatus defined in claim 18 wherein said guide means moving mechanism retracts the guide means transversely outward to an initial position permitting free delivery of cartons of maximum width to said station and the subsequent transverse inward motion to adjacency of the opposed side of any particular carton delivered to said station, said tie means pushing said control means back along said guide means to an initial rearward position upon retraction of said guide means.

20. The apparatus as defined in claim 19 characterized by said dictating means being an electrical circuit switch unit, longitudinally-extending switch unit guiding means mounted on said carton guide means slidably supporting said switch unit thereon, said switch unit actuating means being biased to an outer position in which it extends inward from said switch unit beyond the inner side of said guide means first to contact an opposed carton side as said guide means is moved transversely inward to the carton side, said biased actuating means being depressed by movement of said guide means to contact of the carton side to effect the first switch actuation of one of alternate opening and closure switch manipulations with the other switch manipulation being effected by the biasing upon freeing of its actuating means from the carton side, said tie means being a rigid lever arm pivotally connected at one end to said switch unit.

21. An automatic position adjustable electrical circuit switch device comprising supporting means to be moved forward and back along a first path extending in a certain direction toward and away from a relatively fixed object, a movable switch unit, guiding means on said supporting means mounting said switch unit on the latter for reciprocation along a second path extending at an angle to the first path, switch manipulating trigger means extending from a side of said switch unit toward said object to contact the latter as said supporting means is advanced along the first path toward said object, and an elongated rigid tie member having one end pivotally connected to relatively fixed structure and its other end pivotally connected to said switch unit to cause the latter to advance along the second path as said supporting means is advanced along the first path and said switch unit to retract along the second path as said supporting means retracts along the first path.

22. In an automatic carton closing machine for folding down and inward the front, rear and opposed pair of side flaps of a series of successive open-top cartons of random size to closed lateral lapping positions for securing the folded flaps of each together in carton closing positions the combination with (A) lateral conveyor means having an entrance end and a discharge end and defining a path of forward carton travel along which said conveyor means transports each carton to and past a sensing and flap folding station, (B) a liftable gate mounted at the entrance end to permit entrance of a single carton when lowered and to be lifted to carton-barring position before approach thereto of the next succeeding carton of a suppy thereof, (C) first carton sensing means mounted in the vicinity of and beyond said gate, (D) gate operating means including an electrical control circuit responsive to said sensing means to hold said gate down to permit entrance of a carton in the absence of a carton portion opposite said sensing means and to raise the latter to carton-barring position upon sensing of a portion of a carton by said sensing means temporarily to prevent entrance of the next successive carton, (E) second carton sensing means at said sensing station responsive to the presence of a carton delivered to the latter by an initial section of said conveyor means, (F) a flap folding elevating head mounted at said sensing station for motion down and up toward and away from the top of a carton held at said station having means to fold down the upwardly-extending front flap on the leading top end of the carton thereat when said head is lowered to the carton top, (G) carton top sensing means in the form of electrical circuit limit switching means carried by said head having a plurality of simultaneously operable circuit switches, (H) electrical means alternately to lower and lift said head controlled by said electrical carton top sensing limit switching means to stop the lowering action of said head at the carton top after the folding of the front flap thereby, (I) a pair of opposed carton guiding and clamping rails mounted along the portion of the path of carton travel defined by said second conveyor section and extending through said station, said rails being movable transversely toward each other to carton clamping positions and retractable transversely away from each other to carton receptive positions, (J) electrically energized means to drive said clamping rails toward each other to clamp a carton at said station therebetween and alternately to retract them from each other to free said carton, (K) a control switch common to the electrical circuit of said clamping rail drive means and to the circuit of the electrical means for lowering said head with the latter circuit including in closed condition one of said switches of said head limit switching means to cause said clamping rails to be moved into clamping positions on opposite sides of the carton and the flap folding head to lower down over the top thereof, (L) means to provide clearance between the clamping rails and the sides of the cartons so that said rails thereafter will serve as guides for the carton as it is carried forward to the discharge end, (M) back flap folding means carried by said head to fold down the upwardly-extending flap on the trailing top end of the carton as the latter is transported forward from said sensing station while said head is in its lowered position, and (N) electrically energized means to operate said back flap folding means, of the improvements comprising (a) a continuously driven endless conveyor section constituting an initial section of said conveyor means leading from said gate forward to the sensing and flap folding station and a second periodically driven endless section of said conveyor means extending from a point preceding said station to the discharge end with its entrance end lapping the discharge end of the continuously driven initial section, (b) electrical means to drive said second conveyor section including alternately operable electrical brake and clutch devices which applies the brake to this conveyor section when the clutch is declutched and applies drive thereto through the clutch upon release of the brake, (c) flight means carried by said second conveyor section to stop a carton at said sensing station when this conveyor section is undriven, (d) a pair of alternately operable circuit make and break devices in energizing circuits of said head lowering and lifting electrical means controlled by said second carton sensing means at said sensing station alternately to dictate operation of this electrical means in response to the presence and absence of a carton at said station, (e) the electrical circuit of said clamping rail drive means and the circuit of the electrical means for lowering said head both including one of said circuit make and break devices in open condition whereby the presence of a carton at said sensing station closes this circuit make and break device to cause said clamping rails to be moved into clamping positions on opposite sides of the carton and the flap folding head to lower down over the top thereof, (f) limit switch means operated by said second conveyor section and having a plurality of simultaneously operable switches including said control switch, (g) relay switch means controlling the electrical circuits of said alternately energized brake and clutch devices with said relay switch means having in its energizing circuit in open condition a second one of said switches of said head limit switching means to be closed when said head is lowered to the carton top to initiate drive of said second conveyor section, (h) a second switch of said conveyor limit switch means being located in a holding circuit shunted around said second switch of said head limit switching means in the energizing circuit of said relay switch means and held open during undriven pause of said second conveyor section to be closed upon initial drive of the latter for transport of said carton from said sensing station forward between the guide rails, (i) said control switch of said conveyor limit switch also being common to the circuit of the electrical means for lifting said head to its initial start position with this circuit including the other of said circuit make and break devices in closed position in the absence of a carton at said sensing station whereby after said head is lowered to the top of a carton at said sensing station during a pause of said second conveyor section in response to the presence of the carton thereat and this conveyor section becomes driven to transport the carton forward from said sensing station said head is lifted to its initial start position during a succeeding pause of this second conveyor section and before the next carton arrives at said sensing station, (j) a third switch of said conveyor limit switch means being located in the electrical control circuit of said gate operating means in closed position during pause of said second conveyor section with this switch being open upon drive of the latter whereby said gate is lowered to its carton receptive position upon such pause and is then raised by response of said first carton sensing means to the presence of carton structure beyond said gate, (k) a switch in the energizing circuit of said back flap folding means having a carton sensing control located at said sensing station with said control being mounted upon one of said clamping and guide rails whereby the presence of a clamped carton at said sensing station prevents said back flap folding means from being operated and the forward transport of the carton forward from said sensing station dictates operation of said back flap folding means to fold the back flap forward as the carton is withdrawn from said sensing station, and (l) means carried by said head to fold side flaps of said carton top down over the folded front and back flaps as the carton is transported forward from said sensing station by said second conveyor section.

23. The automatic carton closing machine as defined in claim 22 characterized by said first carton sensing means associated with said gate and said second carton sensing means at said sensing station being in the form of photo cell sytems optically to sense carton structure thereopposite, the sensing means mounted on said head and one of said rails at said sensing station being of mechanical types to respond physically to abutment of carton structure with that on said head sensing the height of each successive carton and that on one of said rails sensing the width of each carton.

References Cited by the Examiner

UNITED STATES PATENTS

| | | | |
|---|---|---|---|
| 2,324,401 | 7/1943 | Kimball | 53—75 |
| 2,550,928 | 5/1951 | Kay | 53—75 |
| 2,909,875 | 10/1959 | IMBS | 53—76 |
| 3,045,402 | 7/1962 | Keely | 53—374 X |
| 3,085,376 | 4/1963 | Ferguson et al. | 53—75 |

TRAVIS S. McGEHEE, *Primary Examiner.*